US009027737B2

(12) United States Patent
Talken et al.

(10) Patent No.: US 9,027,737 B2
(45) Date of Patent: May 12, 2015

(54) SCRUBBER LAYBOY

(75) Inventors: Daniel J. Talken, Lafayette, CA (US); Jonathan R. Ames, El Sobrante, CA (US); Charles K. Benton, San Francisco, CA (US); David R. Carlberg, Oakland, CA (US)

(73) Assignee: Geo. M. Martin Company, Emeryville, CA (US)

( * ) Notice: Subject to any disclaimer, the term of this patent is extended or adjusted under 35 U.S.C. 154(b) by 250 days.

(21) Appl. No.: 13/408,916

(22) Filed: Feb. 29, 2012

(65) Prior Publication Data

US 2012/0222937 A1 Sep. 6, 2012

Related U.S. Application Data

(60) Provisional application No. 61/449,562, filed on Mar. 4, 2011.

(51) Int. Cl.

| | |
|---|---|
| ***B65G 45/18*** | (2006.01) |
| ***B31B 1/00*** | (2006.01) |
| ***B26D 7/18*** | (2006.01) |

(52) U.S. Cl.

CPC ... *B31B 1/00* (2013.01); *B26D 7/18* (2013.01); *B31B 2201/0247* (2013.01); *B31B 2201/922* (2013.01)

(58) Field of Classification Search

USPC ................................ 198/620–626.6; 271/188

See application file for complete search history.

(56) References Cited

U.S. PATENT DOCUMENTS 2,101,328 A * 12/1937 Broadmeyer ................ 271/188
2,212,300 A 8/1940 Whorter
2,843,377 A * 7/1958 Battersby ...................... 271/188
3,000,631 A 9/1961 Hain
3,380,328 A 4/1968 Martin
3,395,598 A 8/1968 Martin
3,565,423 A 2/1971 Kluth (Continued)

FOREIGN PATENT DOCUMENTS

| | | |
|---|---|---|
| EP | 0493229 | 7/1992 |
| EP | 2149436 | 2/2010 |
| EP | 2495098 | 9/2012 |

OTHER PUBLICATIONS

European Search Report dated Jul. 13, 2012, European Patent Application No. 12157927.0.

(Continued)

*Primary Examiner* — William R Harp
(74) *Attorney, Agent, or Firm* — Vierra Magen Marcus LLP

(57) ABSTRACT

A Layboy machine for the transportation of corrugated boxes including one or more Scrap Separation devices for improved Scrap separation. The Scrap Separation means include a Compliant Scrap Blocker for Loose Scrap, an Opposing Phase Shift Beater for Trapped Scrap and all types of Hanging Chads, a Chad Wall for stripping Lead Edge Trim, Trail Edge Trim and Side Edge Trim Scrap, a Compliant Scrap Blocker-Wedge Roller for harsher scrubbing of the box and motivating Scrap above the Board Line to move to under the Board Line and Side Edge Trim Chad Stripper which is removes Side Edge Trim Chads. The Wheel Assemblies are superior in allowing the proper configuration of the various Scrap Separation Means. The concept of the staggered Wheel Assemblies also leads to reduced Order Setup Time, better board control and reduced Print Damage and Box Size variation out of the Press.

37 Claims, 24 Drawing Sheets

(56) References Cited

U.S. PATENT DOCUMENTS

| | | | | |
|---|---|---|---|---|
| 3,589,599 | A | | 6/1971 | Brandt |
| 3,612,270 | A | | 10/1971 | Benbenek |
| 3,626,561 | A | | 12/1971 | Luce |
| 3,650,376 | A | | 3/1972 | Burgis |
| 3,650,446 | A | | 3/1972 | Samluk |
| 3,693,850 | A | | 9/1972 | Feild |
| 3,761,074 | A | | 9/1973 | Benbenek |
| 3,827,322 | A | | 8/1974 | Saunders |
| 3,860,232 | A | | 1/1975 | Martin |
| 3,880,420 | A | | 4/1975 | Martin |
| 3,889,863 | A | | 6/1975 | Deslauriers |
| 3,912,258 | A | | 10/1975 | Martin |
| 3,942,786 | A | | 3/1976 | Lauren |
| 3,992,001 | A | | 11/1976 | Martin |
| 4,099,712 | A | | 7/1978 | Martin |
| 4,106,767 | A | * | 8/1978 | Schirrmeister et al. ....... 271/188 |
| 4,111,411 | A | | 9/1978 | Graves |
| 4,177,536 | A | | 12/1979 | Powers |
| 4,229,827 | A | | 10/1980 | Bowman |
| 4,238,870 | A | | 12/1980 | Fahlen |
| 4,269,401 | A | * | 5/1981 | Sargis et al. ............... 270/58.18 |
| 4,305,716 | A | | 12/1981 | Nickum |
| 4,306,476 | A | | 12/1981 | Saunders |
| 4,319,442 | A | | 3/1982 | Frye |
| 4,369,682 | A | | 1/1983 | Bunnell |
| 4,380,332 | A | | 4/1983 | Davis |
| 4,433,774 | A | | 2/1984 | Lopes |
| 4,467,948 | A | | 8/1984 | Deslauriers |
| 4,474,565 | A | | 10/1984 | Watson |
| 4,499,802 | A | | 2/1985 | Simpson |
| 4,589,650 | A | * | 5/1986 | Miyoshi ........................ 271/242 |
| 4,740,193 | A | | 4/1988 | Frost |
| 4,846,030 | A | | 7/1989 | McMahon |
| 4,852,712 | A | | 8/1989 | Best |
| 4,900,297 | A | | 2/1990 | Frost |
| 4,955,102 | A | | 9/1990 | Cousins |
| 5,026,249 | A | | 6/1991 | Shill |
| 5,039,083 | A | | 8/1991 | Senn |
| 5,111,725 | A | | 5/1992 | Simpson |
| 5,152,522 | A | * | 10/1992 | Yamashita .................... 271/264 |
| 5,365,815 | A | | 11/1994 | Pfaff, Jr. |
| 5,697,878 | A | | 12/1997 | Elkis |
| 5,701,789 | A | | 12/1997 | Okonski |
| 5,931,455 | A | | 8/1999 | Okui |
| 6,332,488 | B1 | | 12/2001 | Walsh |
| 6,427,097 | B1 | | 7/2002 | Martin |
| 6,619,653 | B2 | | 9/2003 | Dobrindt |
| 6,669,191 | B2 | | 12/2003 | Lee |
| 6,851,539 | B2 | | 2/2005 | Flippo |
| 7,044,040 | B1 | | 5/2006 | Smith |
| 2004/0182830 | A1 | | 9/2004 | Hesterman |
| 2013/0319195 | A1 | | 12/2013 | Talken |

OTHER PUBLICATIONS

European Search Report dated Sep. 25, 2013, Europe Patent Application No. 13169261.8.

* cited by examiner

SCRUBBER LAYBOY

This application claims priority to U.S. Provisional Application 61/449,562, filed on Mar. 4, 2011.

BACKGROUND

Manufacturers of corrugated paper products, known as Box Makers, produce both foldable boxes which have been folded and glued at the factory and die cut flat sheets which may be used either in their flat state or folded into a desired shape. These will be referred to as folded boxes and flat boxes respectively. The term boxes alone can refer to both folded and flat boxes.

Both the folded boxes and the flat boxes are produced by Converting machinery which processes the Corrugated Sheet Stock produced by the machinery known as a Corrugator. The Corrugated Sheet Stock is corrugated material cut to a specific size with optional scoring. Scoring is the intentional crushing of the corrugated flutes in order to allow folding of the corrugated material. However, the Corrugated Sheet Stock has not been cut or notched to the detail typically required to produce the final foldable boxes or the flat boxes.

Often customized printing is required on boxes which may be done by 1) using a preprinted material integrated into the Corrugated Sheet Stock on the Corrugator, 2) using flexographic printing during the Converting process or 3) applying ink or labels post Converting through various techniques.

During the Converting process the Corrugated Sheet Stock is transformed into a box by performing additional cutting and optionally adding scoring and printing. There are multiple possible purposes for the additional cutting of the Corrugated Sheet Stock. Many of these cutting operations will result in pieces of the original Corrugated Sheet Stock being completely separated from the final box. These pieces are in general referred to as Scrap.

In order to achieve to proper registration of the printing and the edges of the box the Corrugated Sheet Stock may be oversized slightly so that some or all of the perimeter is trimmed during the Converting process. This results in what is being defined as Edge Trim Scrap. The Corrugated Sheet Stock is moving in a flow direction during the Converting process and thus Lead Edge Trim Scrap is the Scrap along the entire front edge of the Corrugated Sheet Stock, first to be processed by the Converting machinery. Trail Edge Trim Scrap is the Scrap along the entire back edge of the Corrugated Sheet Stock, last to be processed. Side Edge Trim Scrap is produced on both sides of the Corrugated Sheet Stock. Slot Scrap is a common relatively long but narrow type of Scrap which when removed allows boxes to be folded properly. All other Scrap will be referred to as Internal Scrap and can come in many sizes and shapes.

If the Scrap is cut complete free from the box and the Ejecting Rubber completely dislodges the Scraps from the box, the Scrap is referred to as Loose Scrap. If Internal Scrap is cut completely free from the box but the Ejecting Rubber fails to dislodge the Scraps from the Box, the Scrap is referred to as Trapped Scrap. If the Scrap is not cut completely free from the box and the Ejecting Rubber fails to tear the Scrap from the box, the Scrap is often attached by a minimal amount of paper hanging onto the box by a thread and is referred to as Hanging Chads. The amount of residual paper connecting the Hanging Chad to the box determines the Hanging Chad Strength which is defined as the pulling force required to tear the Hanging Chad from the Box. There may also be other types of Scrap.

As the boxes are produced there are a variety of methods to form Stacks of the boxes which in turn are sold to other companies which will be referred to as the Box Customer. There are a multitude of applications for these boxes and there are many reasons why it is undesirable for the Scrap to be included in shipment to the Box Customer. Erecting of the box is the process of taking the box and manipulating it by folding, bending, interlocking, stapling, taping, etc. in order for the box to be ready for its final usage. For Box Customers that manually erect their Boxes, the inclusion of Scrap is undesirable because of the additional mess created. For Box Customers that use automatic machinery to erect their Boxes, the Scrap can lead to jams in their machinery causing undesirable downtime and lower production. For Box Customers that use the box for food, such as a pizza box, having Scrap included in the final erected box is clearly undesirable.

In the conversion of the Corrugated Sheet Stock into Boxes the material is fed through machinery. The Lead Edge for both Corrugated Sheet Stock and Boxes refers to the first edge of travel across the machine whereas the Trailing Edge refers to the last edge of travel across the machine. The Corrugated Sheet Stock may be cut completely in the cross-machine direction in one or more locations to create two or more boxes in the through-machine direction. These are referred to as Ups. The Corrugated Sheet Stock may be cut completely in the through-machine direction in one or more locations to create two or more boxes in the cross-machine direction. These are referred to as Outs.

There are multiple methods by which the cutting of the Corrugated Sheet Stock may be accomplished during the Converting process. One example method for cutting Corrugated Sheet Stock is known as Rotary Die Cutting. A typical configuration of a Rotary Die Cutter, known as Rule and Rubber, uses of a pair of cylinders where the lower cylinder, known as the Anvil, is covered in a firm but soft rubber material and the top cylinder is mounted with a Die Board. The Die Board is normally a curved plywood base in which embedded are a customized set of steel Rules, which protrude from the plywood base and when rotated with the Anvil will cut and score the Corrugated Sheet Stock into the final desired box. The actual cutting of the box occurs where the tangent of the Die Board meets the tangent of the Anvil. Since there is a finite distance over which cutting occurs, the region of cutting and Die Board control is referred to as the Die Board Control Zone. Ejecting Rubber is located on the plywood base of the Die Board between the rules in order to eject the Scrap as the boxes emerge from the nip point of the Die Board and the Anvil. The path of the box between the Die Board and the Anvil is theoretically horizontal and is known as the Board Line. However, in reality the box may vary from the Board Line as it exits the Rotary Die Cutter, due to warp of the Corrugated Sheet Stock and the potential sticking or over-ejecting by the Die Board. The transportation speed of the box, as determined by the effective linear speed at the nip of the Die Board and Anvil, is known as Line Speed. Also relevant would be the similar process of steel-on-on steel Rotary Die Cutting. The Rotary Die Cutting process is relevant since there is not an integral method in the process for positive separation of the Scrap from the box.

A box that has been Die Cut commonly has cutting and scoring such that when folded a corner is naturally formed. When in flat form, the corner is a peninsula of corrugated material at the corner of the box, and referred to as a Flap. Since the Flaps are partially cut from the main body of the box, they are less rigid, require better support during transportation and are more easily bent backwards.

The foldable box is typically produced by a system referred to in the industry as a Flexo Folder Gluer. This may include Rotary Die Cutting or Slotting-Scoring. The Flat Box is typically produced by either a Rotary Die Cutter (which includes Rotary Die Cutting) or by a Flat Bed Die Cutter.

For the purposes of this document, the term Press will refer to the machinery that feeds, prints and cuts the Corrugated Sheet Stock to produce the final boxes.

The Box Makers typically have many customers and a wide variety of different style of boxes which need to be produced. They need to set up and run many different orders during a given production period. The Box Maker is highly motivated to reduce the time used for setting up a new order. This is known as Order Setup Time.

The Box Maker often will setup and run an order initially and then need to repeat running of the order multiple times periodically in the future. There is value to the Box Maker in providing the ability to setup faster for a repeat order by returning to the configuration specified by the operator the last time the order ran. This is known is Repeat Order Setup.

The quality of the box surface and print quality is an important factor to the Box Maker. Any process that damages the actual surface of the corrugated material or reduces the quality of the printing by smearing or marking can result in unsellable boxes or boxes of lower value. Many Layboy applications involve sandwiching the box as it is being conveyed. Excessive pressure on the box can create permanent crushing of the box flutes which is known as False Scoring. Exposing a printed surface of the box to a conveying surface with a significant combination of relative velocity and pressure can damage the print which is known as Print Damage.

SUMMARY

A Layboy machine is proposed that transports corrugated boxes and includes one or more Scrap Separation Means for improved Scrap separation. The Scrap Separation means include any one or a combination of a Compliant Scrap Blocker for Loose Scrap, an Opposing Phase Shift Beater for Trapped Scrap and all types of Hanging Chads, a Chad Wall for stripping Lead Edge Trim, Trail Edge Trim and Side Edge Trim Scrap, a Compliant Scrap Blocker-Wedge Roller for harsher scrubbing of the box and providing a positive motivation for Scrap above the Board Line to move to under the Board Line, and an Edge Trim Chad Stripper which is removes Edge Trim Chads. The Layboy includes staggered Wheel Assemblies for transport and to allow the proper configuration of the various Scrap Separation Means. The concept of the staggered Wheel Assemblies also leads to reduced Order Setup Time, better board control and reduced Print Damage and Box Size variation. This technology herein is applicable to both the production of Folded Boxes and Flat Boxes.

One embodiment includes a Layboy assembly for receiving boxes including Scrap from upstream processing equipment and transporting the box through the Layboy to downstream processing equipment. The Layboy assembly comprises a bottom assembly having an entrance end and an exit end. The bottom assembly has a wheel assembly generally oriented in the cross-machine direction, with the wheel assembly consisting of a shaft operatively connected to a plurality of laterally spaced wheels for the conveyance of boxes in the through-machine direction. The bottom assembly having additional conveying means located adjacent in the through-machine direction to the wheel assembly for transportation of boxes and creating a gap in the through-machine direction extending across the machine between the additional conveying means and the wheel assembly. The Layboy assembly further comprises a top assembly having an entrance end and an exit end. The top assembly has conveying means for transporting boxes from the entrance end to the exit end. The Layboy assembly further comprises a frame to operatively orient and connect the bottom assembly and top assembly creating a controllable sandwich space between the bottom assembly and top assembly conveying surfaces and a Scrap removal means located in the gap extending across the bottom assembly creating direct mechanical contact on the Scrap, motivating the Scrap to be separated from the boxes.

DETAILED DESCRIPTION

Figures 8A, 8B:
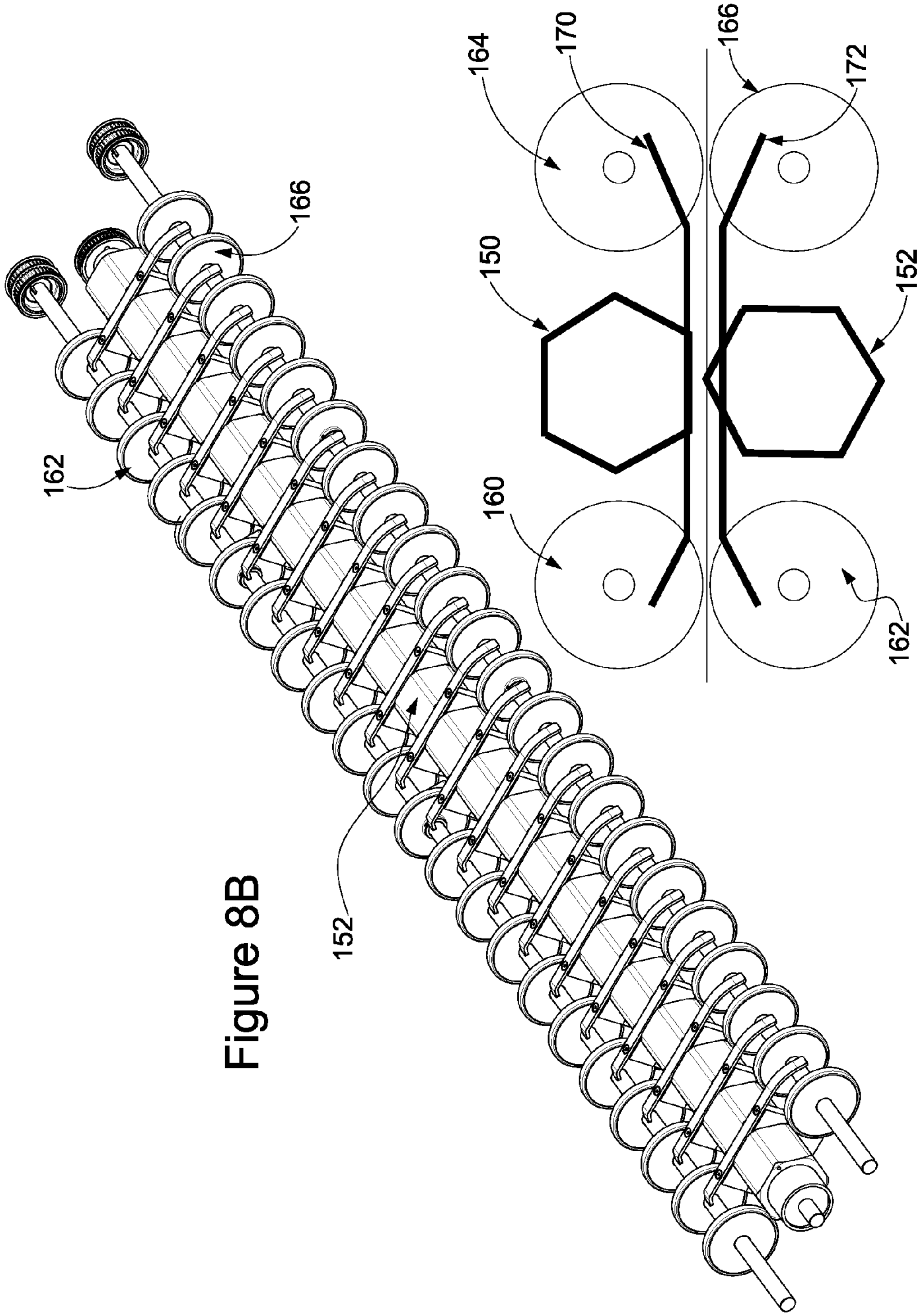

FIGS. 8A and 8*b* show one embodiment of Opposing Phase Shift Beater Bars.

Figure 9:
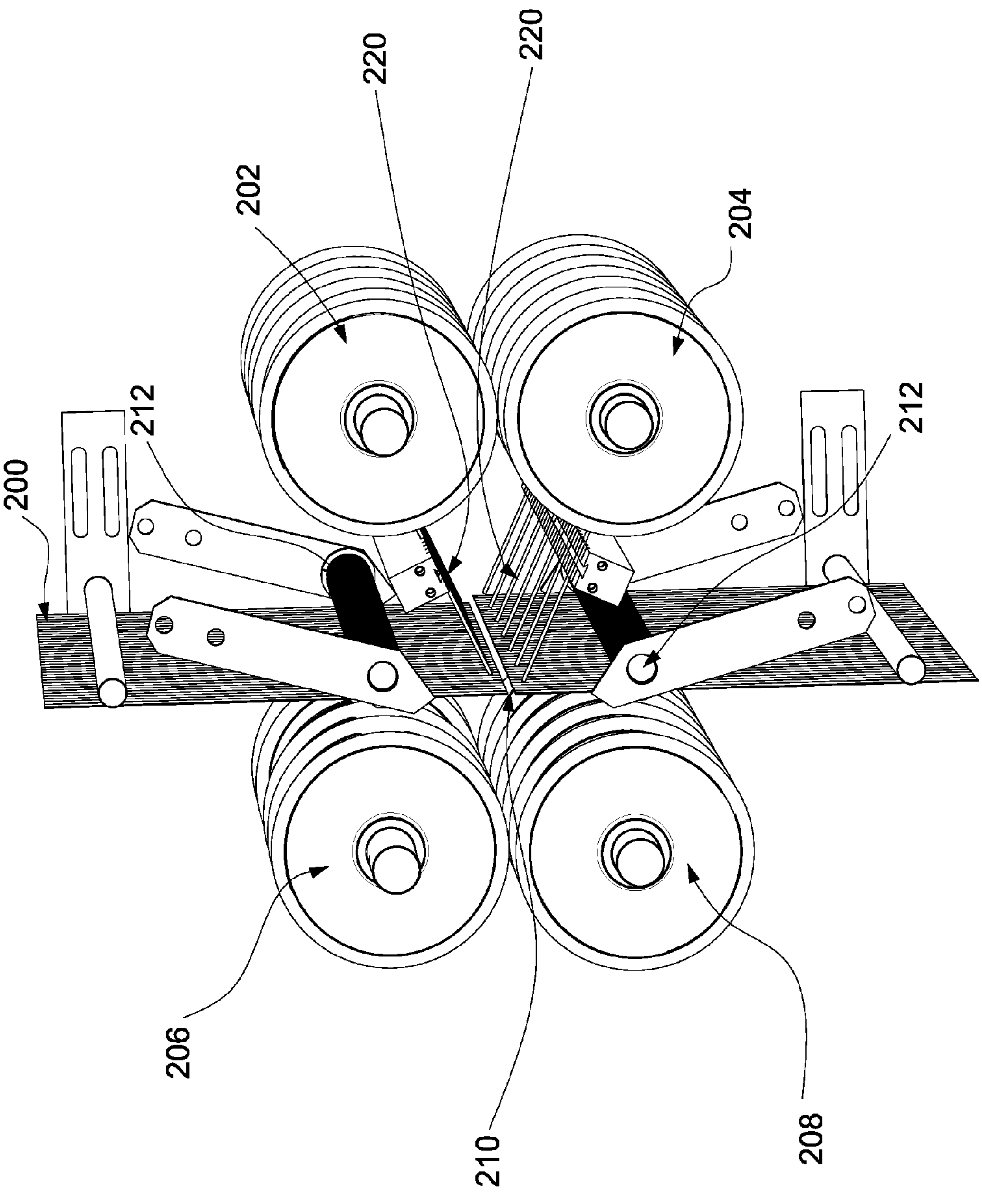

FIG. 9 shows one embodiment of a Chad Wall.

Figure 10:
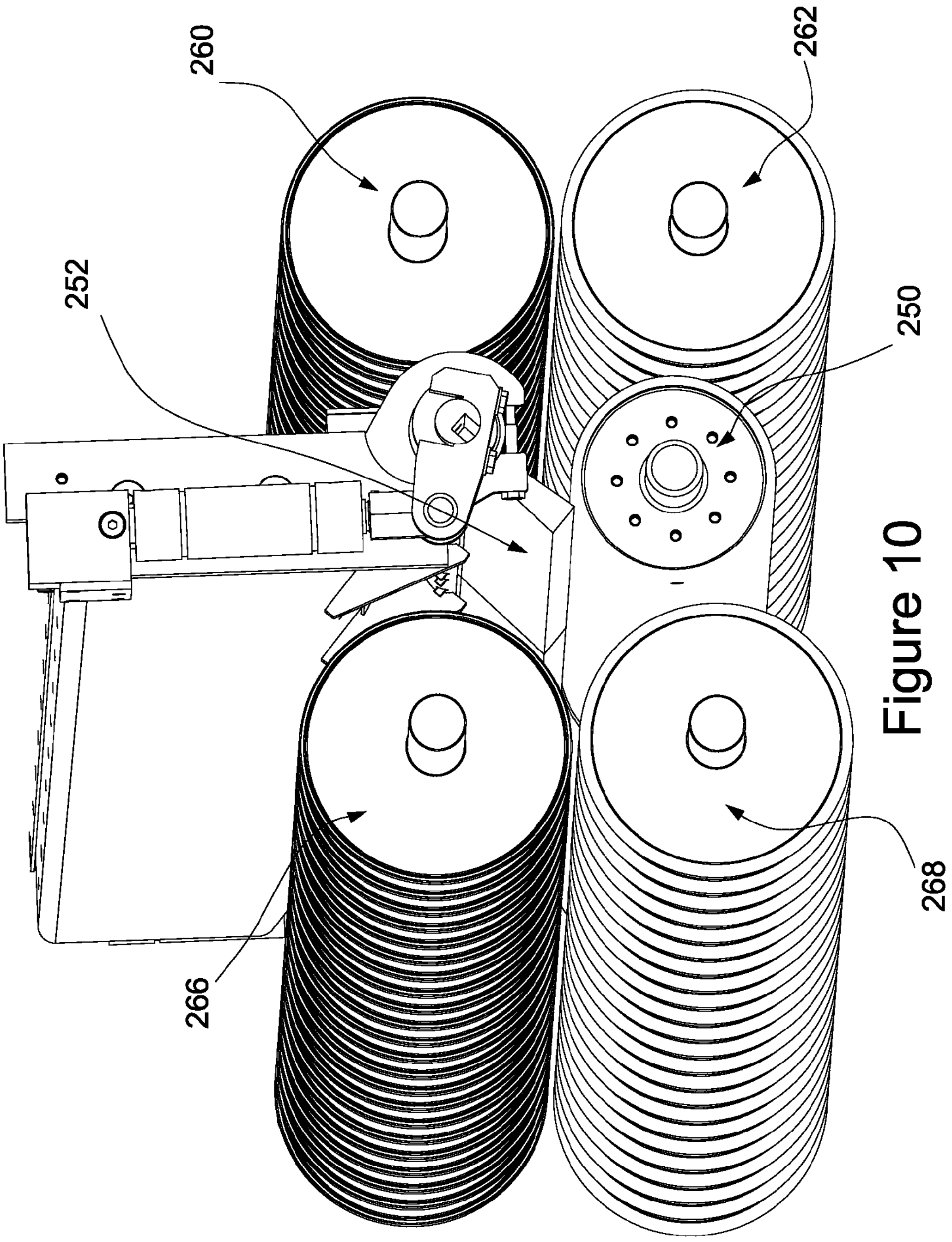
Figure 11:
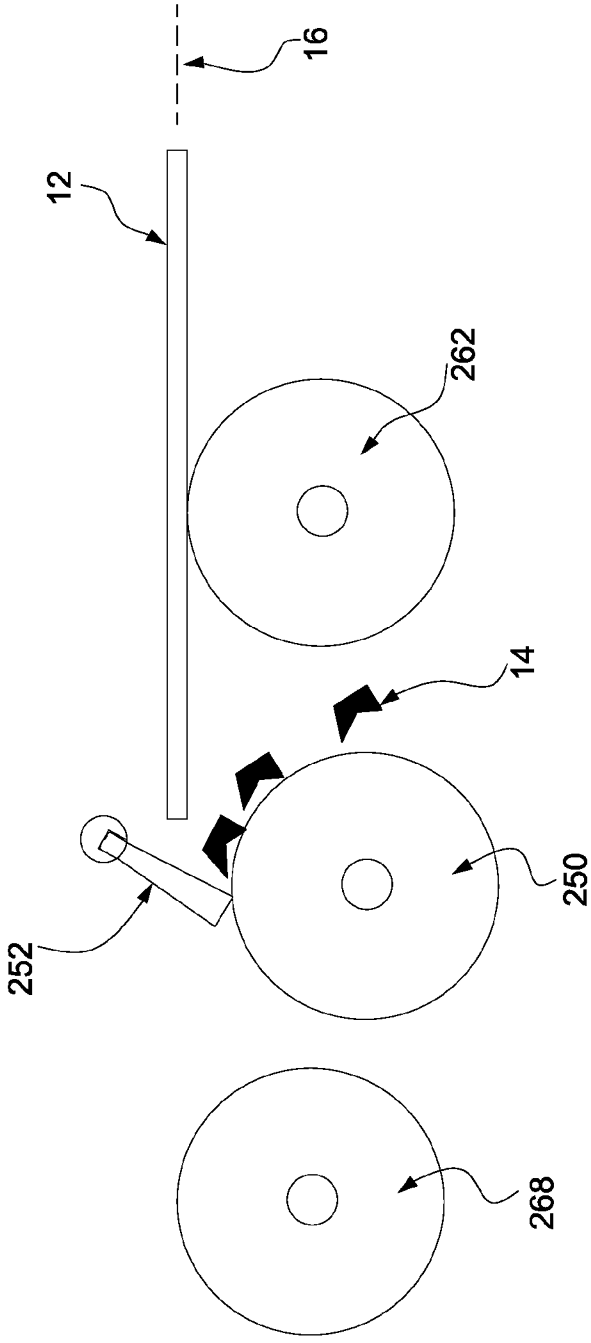

FIGS. 10 and 11 show one embodiment of a Compliant Scrap Blocker-Wedge Roller.

Figure 12:
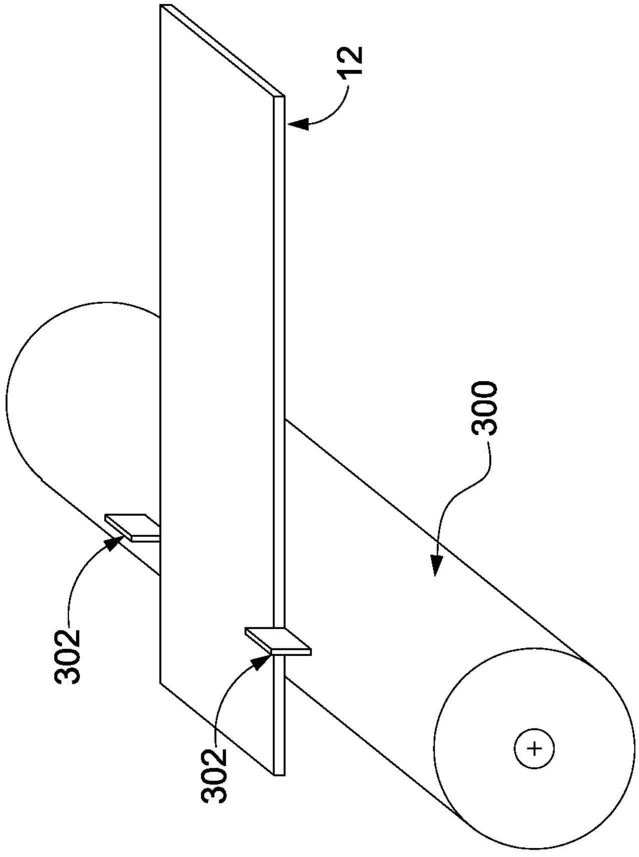

FIG. 12 depicts one embodiment of an Side Edge Trim Stripper.

Figure 13A:
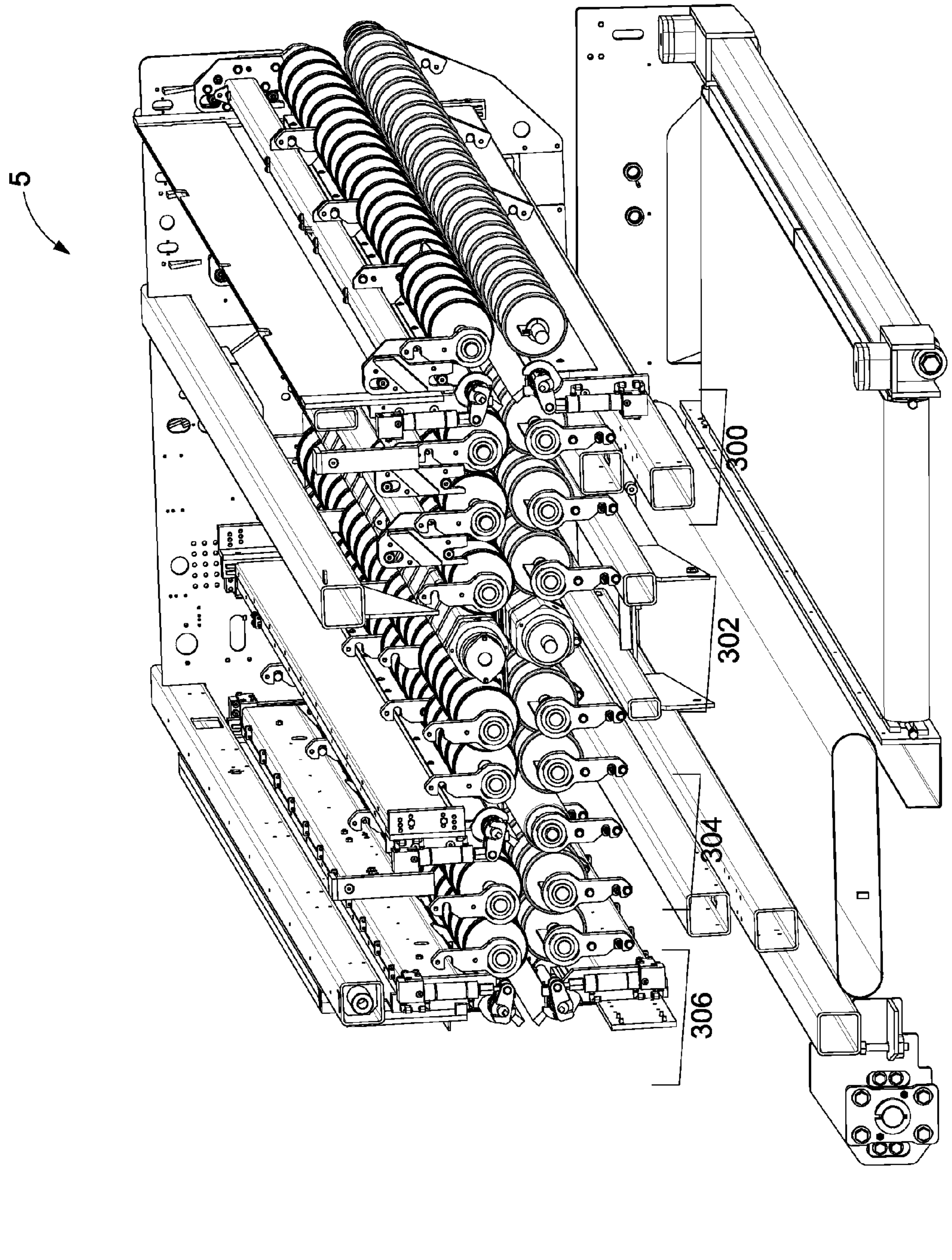

FIG. 13A depicts one embodiment of a Layboy having multiple wheel assemblies and multiple Scrap Separation Means.

Figure 13B:
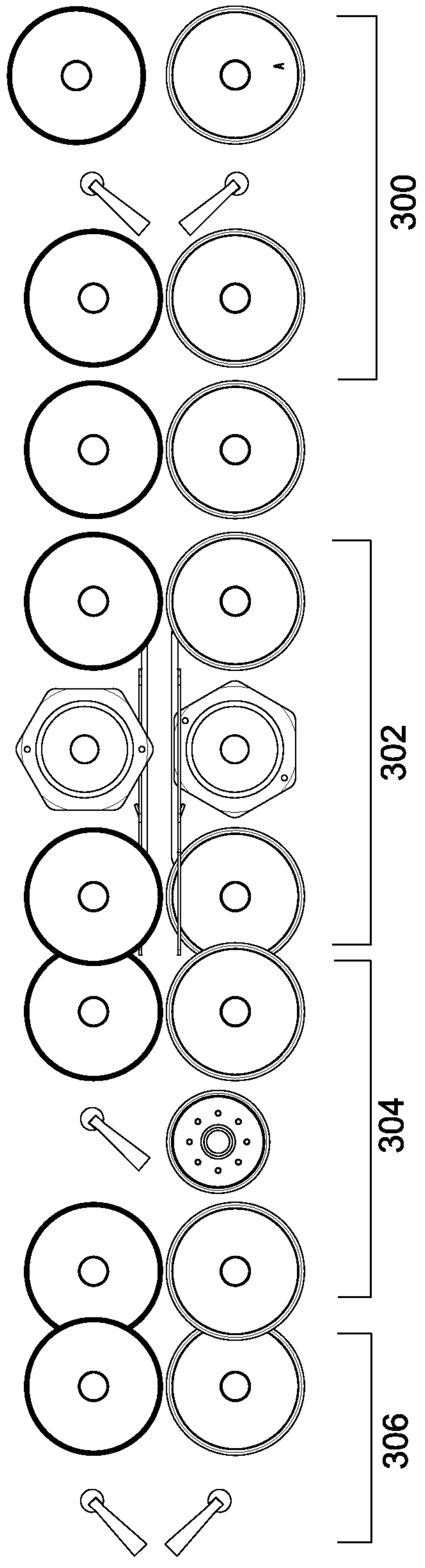

FIG. 13B is a simplified version of FIG. 13A.

Figure 14:
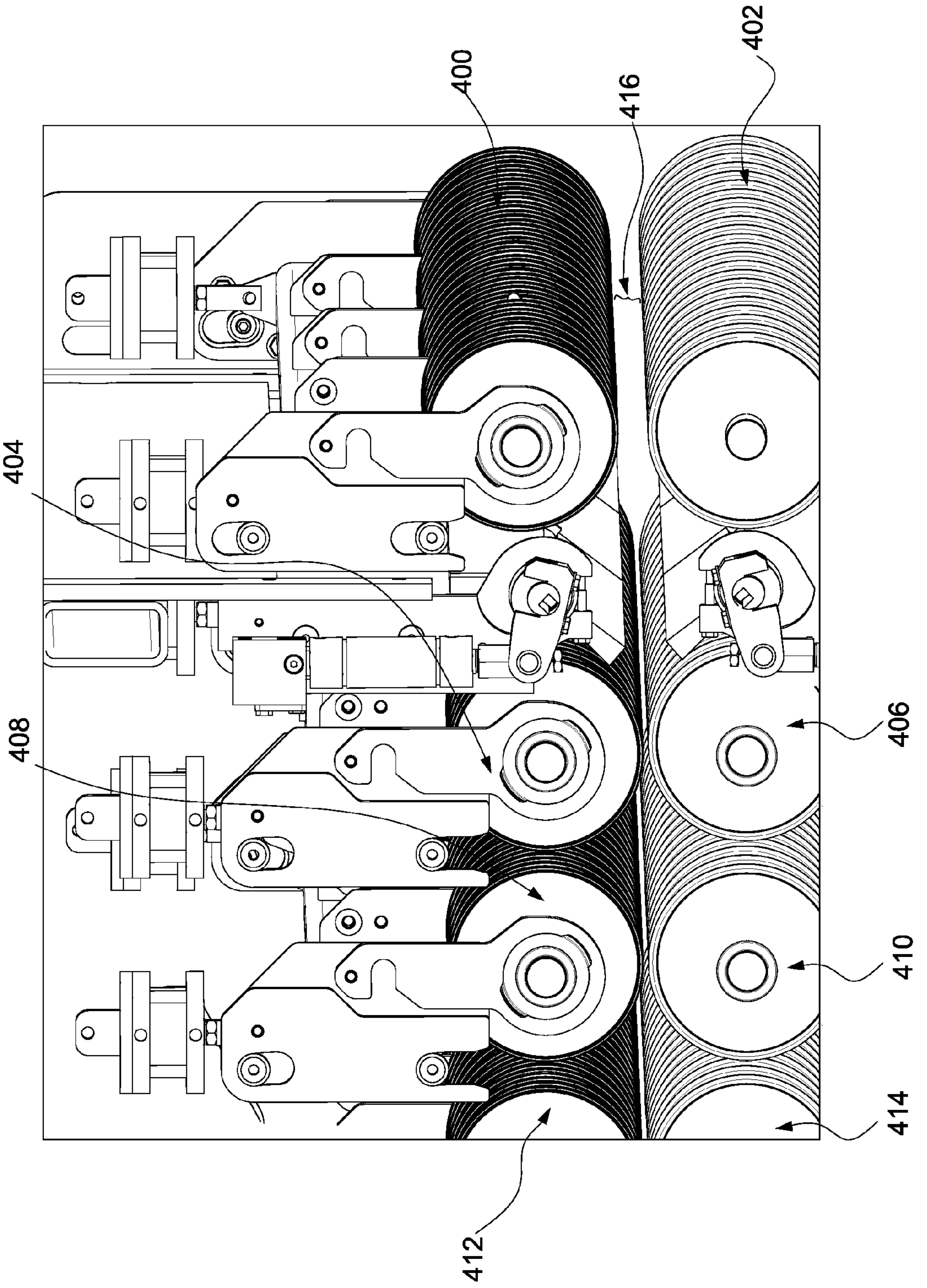

FIG. 14 depicts one example of the Wheel Assemblies are arranged in a special way adjacent to the Die Board Control Zone.

Figure 15:
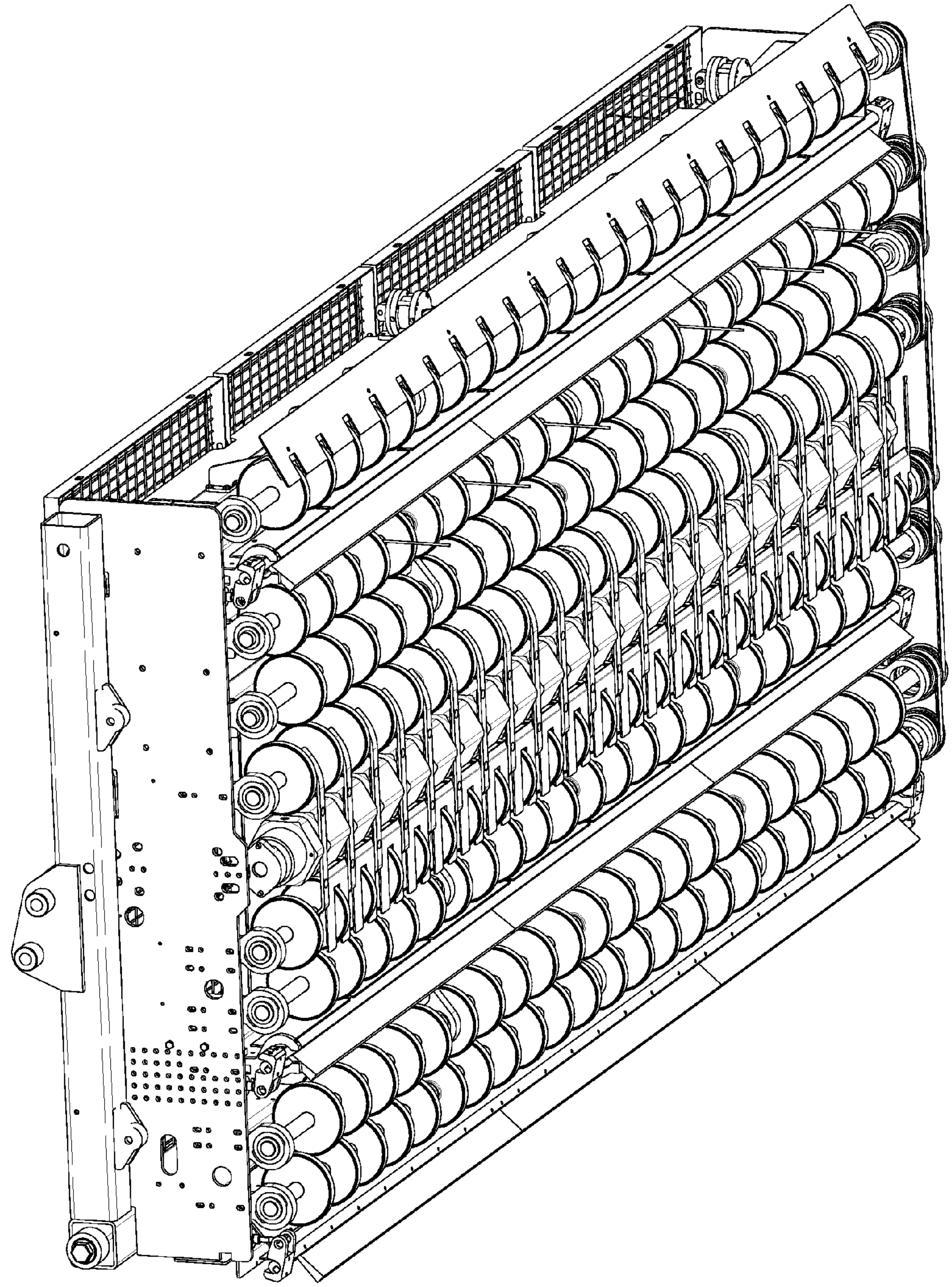

FIG. 15 depicts one embodiment of a top plurality of Wheel Assemblies.

Figure 16:
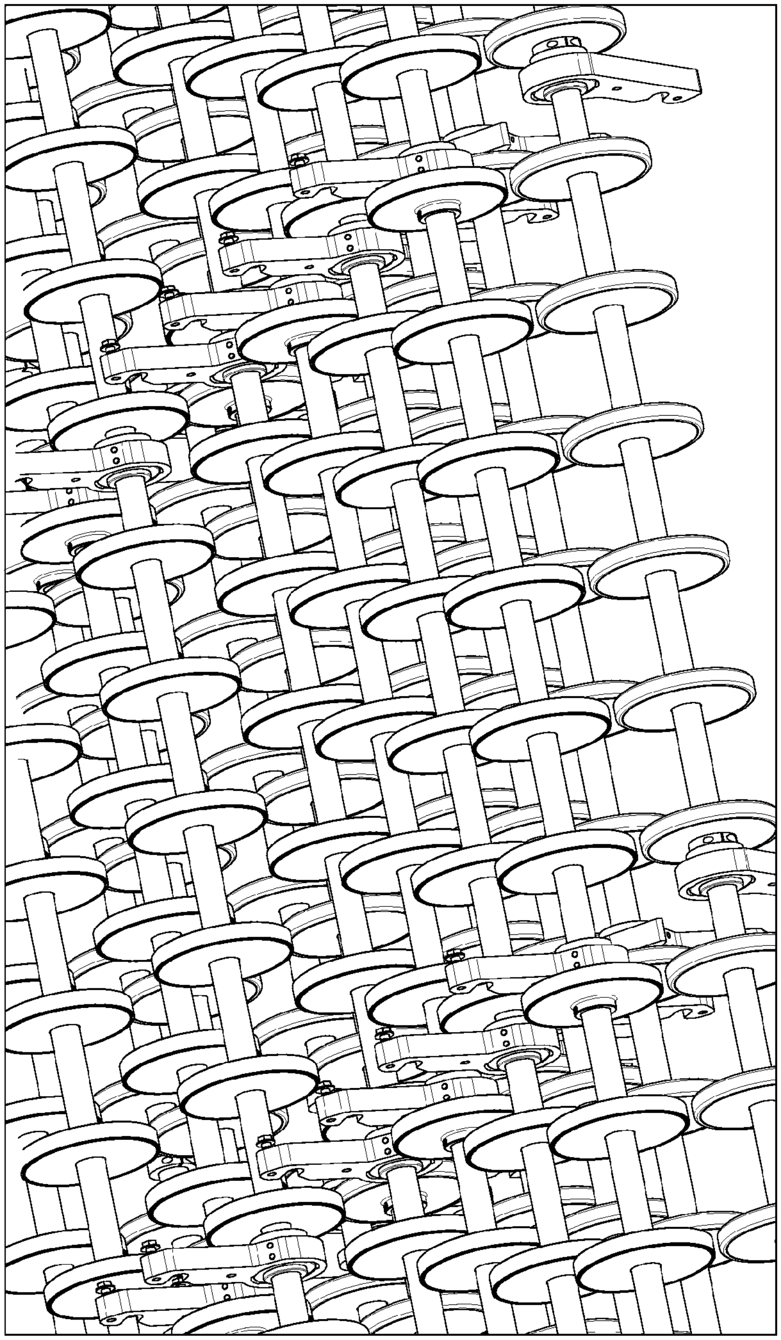

FIG. 16 depicts one embodiment of top and bottom Wheel Assemblies.

Figure 17C:
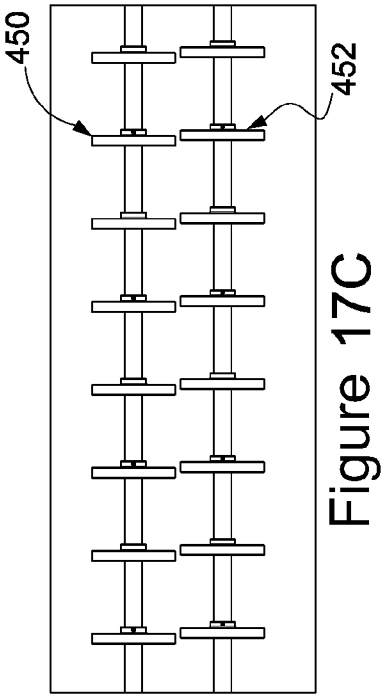
Figure 17B:
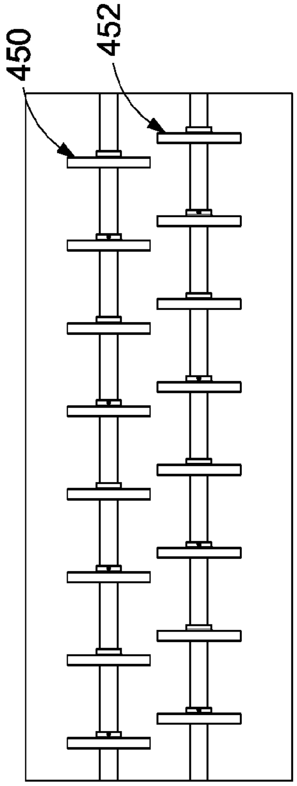
Figure 17A:
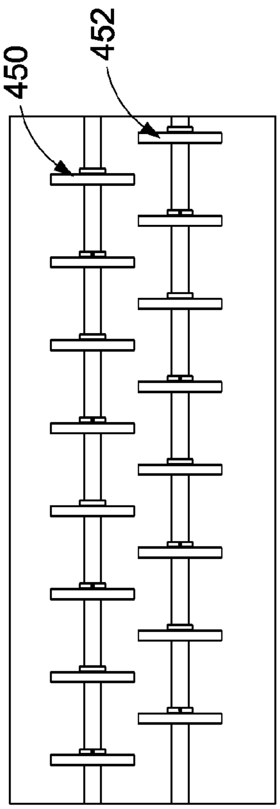

FIGS. 17A-C depict embodiments of top and bottom Wheel Assemblies.

Figure 18:
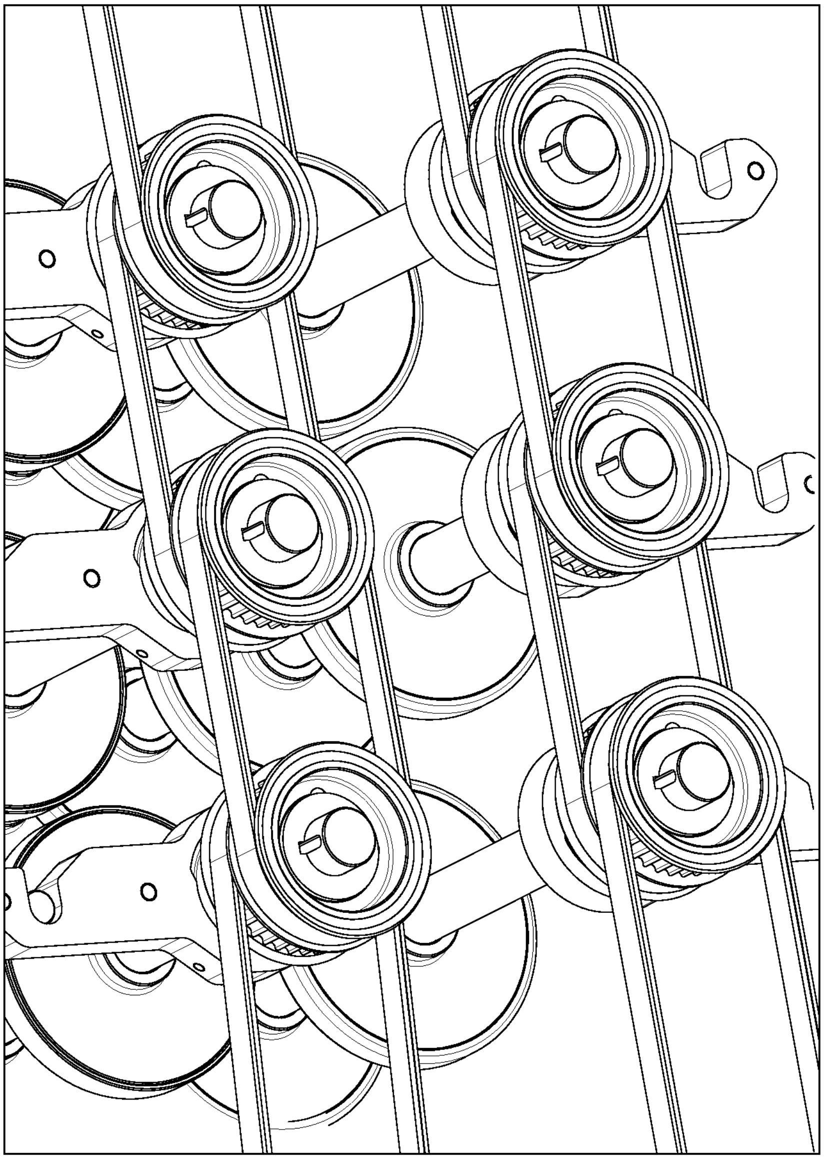

FIG. 18 depicts Wheel Assemblies driven by timing belts.

Figure 19:
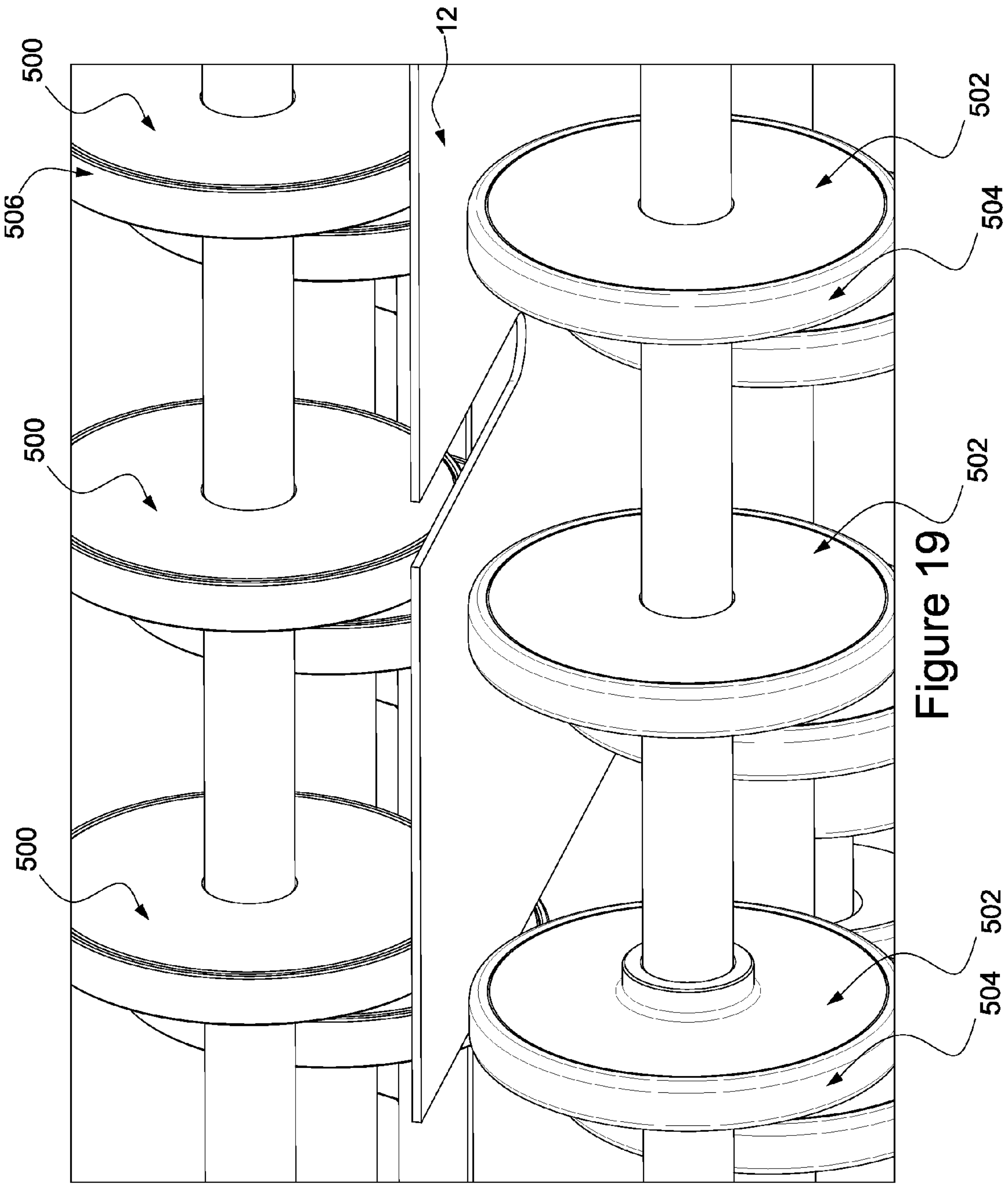

FIG. 19 depicts top and bottom Wheel Assemblies.

Figure 20:
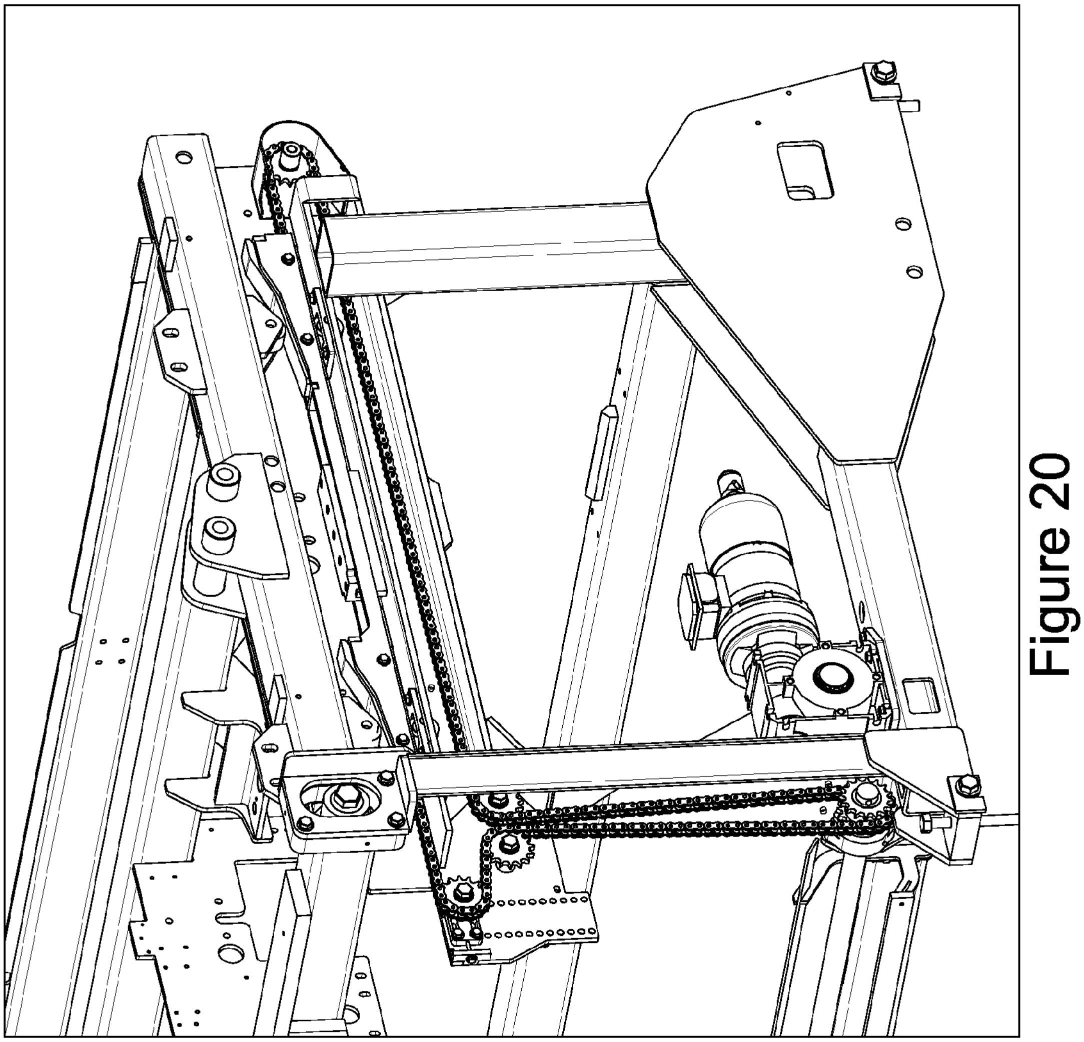

FIG. 20 depicts the Master Nip Control System.

Figure 21:
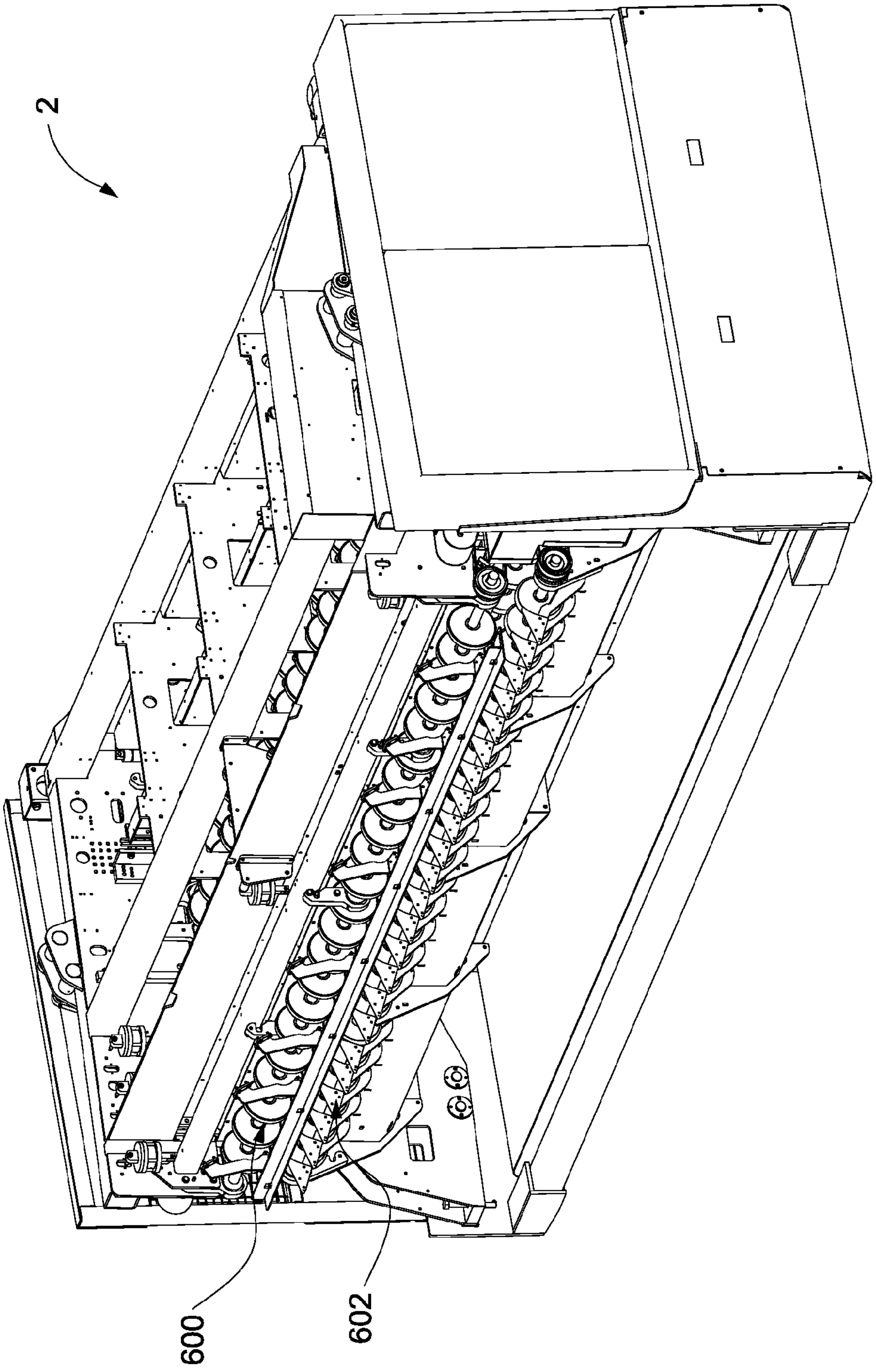

FIG. 21 shows Layboy in a running position.

Figure 22:
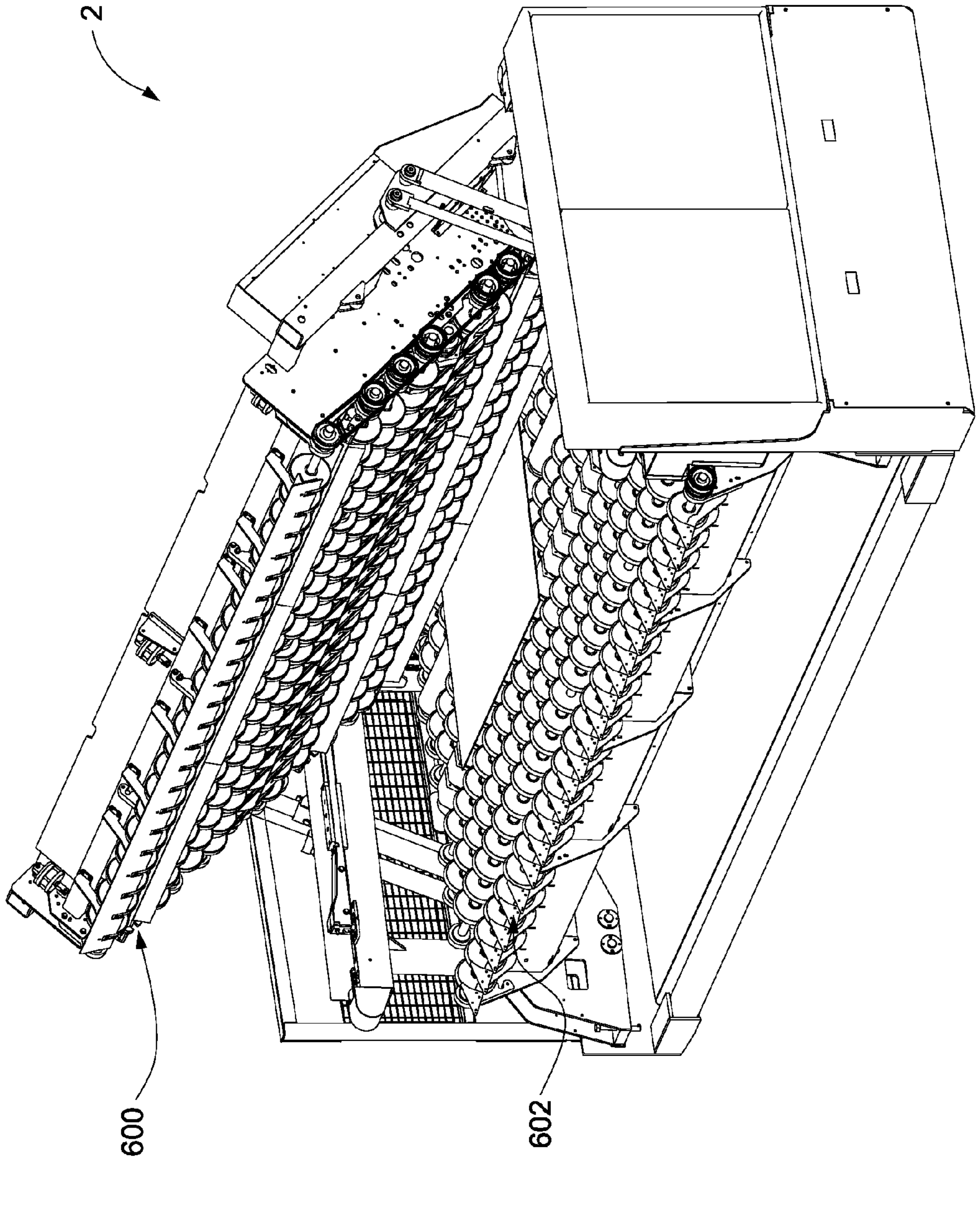

FIG. 22 shows Layboy in an open position to clear jams.

Figure 23:
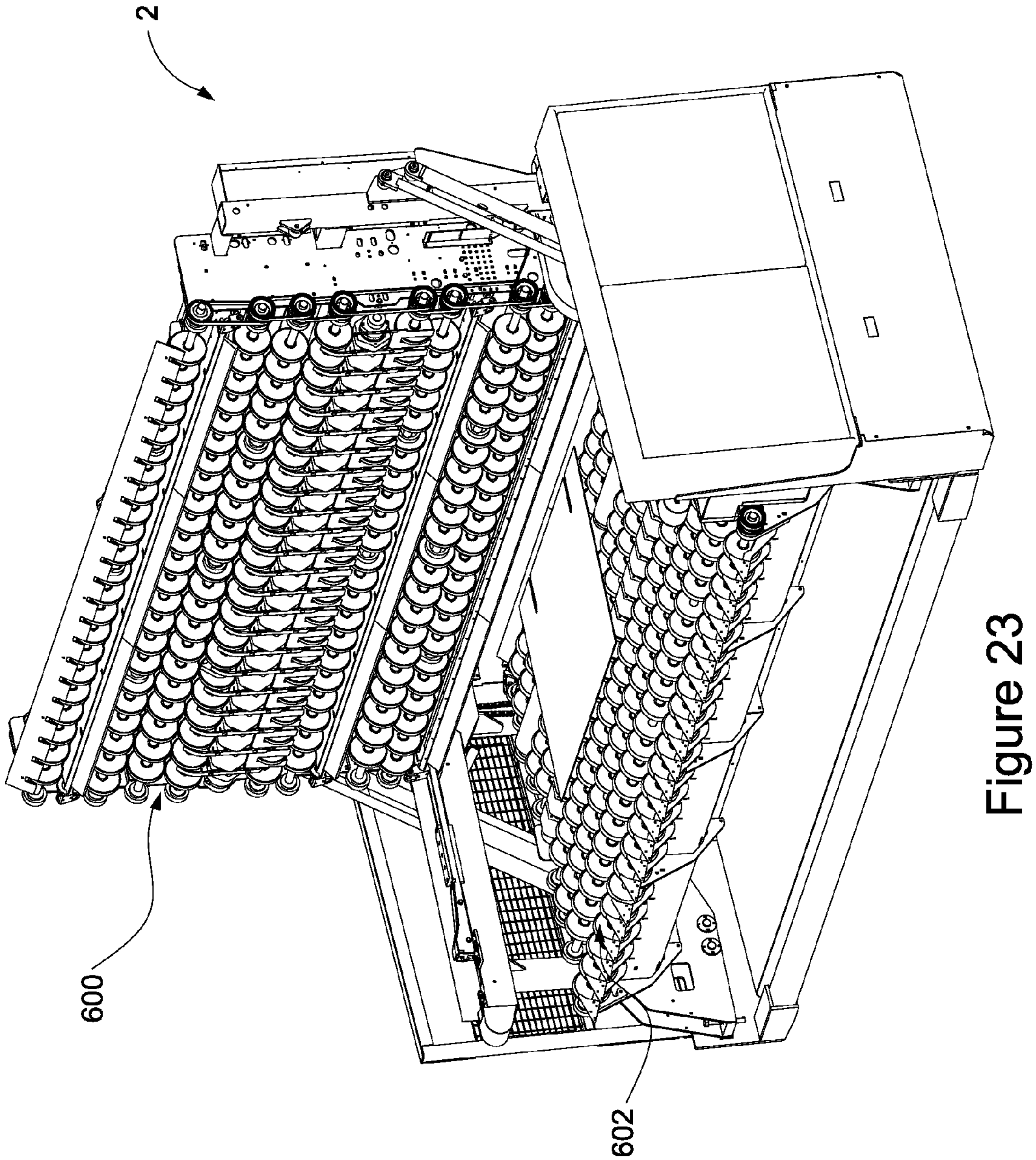

FIG. 23 shows Layboy in an open position to perform maintenance.

DETAILED DESCRIPTION

For the purposes of this document, the term Conveyor will refer to a mechanical apparatus consisting of an endless moving belt, chain or other material wrapped around two or more pulleys to transport material by means of surface contact between the belt, chain or other material which moves in a linear motion motivated by the rotary motion of one of more of the pulleys. The term Conveyor Belt will be used with the understanding that is also could be endless chain or other material. The cross section of the Conveyor Belt can be of a variety of shapes, typically round, rectangular or V. The cross section defines the Conveyor Belt Width and defines the surface used for material transport.

In some prior art devices, transportation of the box within a Layboy is accomplished by the use of Conveyors. In U.S. Pat. No. 3,860,232, there is a plurality of thin conveyors laterally offset for both top and bottom contact arranged such to allow sandwiching of the boxes during transportation. In U.S. Pat. No. 4,900,297, there is a plurality of thin conveyors laterally offset for bottom contact with two wide side-by-side wide conveyors for top contact arranged such to allow sandwiching of the boxes during transportation. In U.S. Pat. No. 5,026,249, there is a plurality of thin conveyors laterally offset for bottom contact with vacuum capability to eliminate the need for the sandwiching arrangement.

The improved Layboy described herein is located between the upstream Press (which produces the Boxes with Scrap) and the downstream processing equipment (which typically makes stacks of the boxes). The Improved Layboy can be referred to as a Scrubber Layboy due to the improved Scrap Separation Means described herein.

Figure 1:
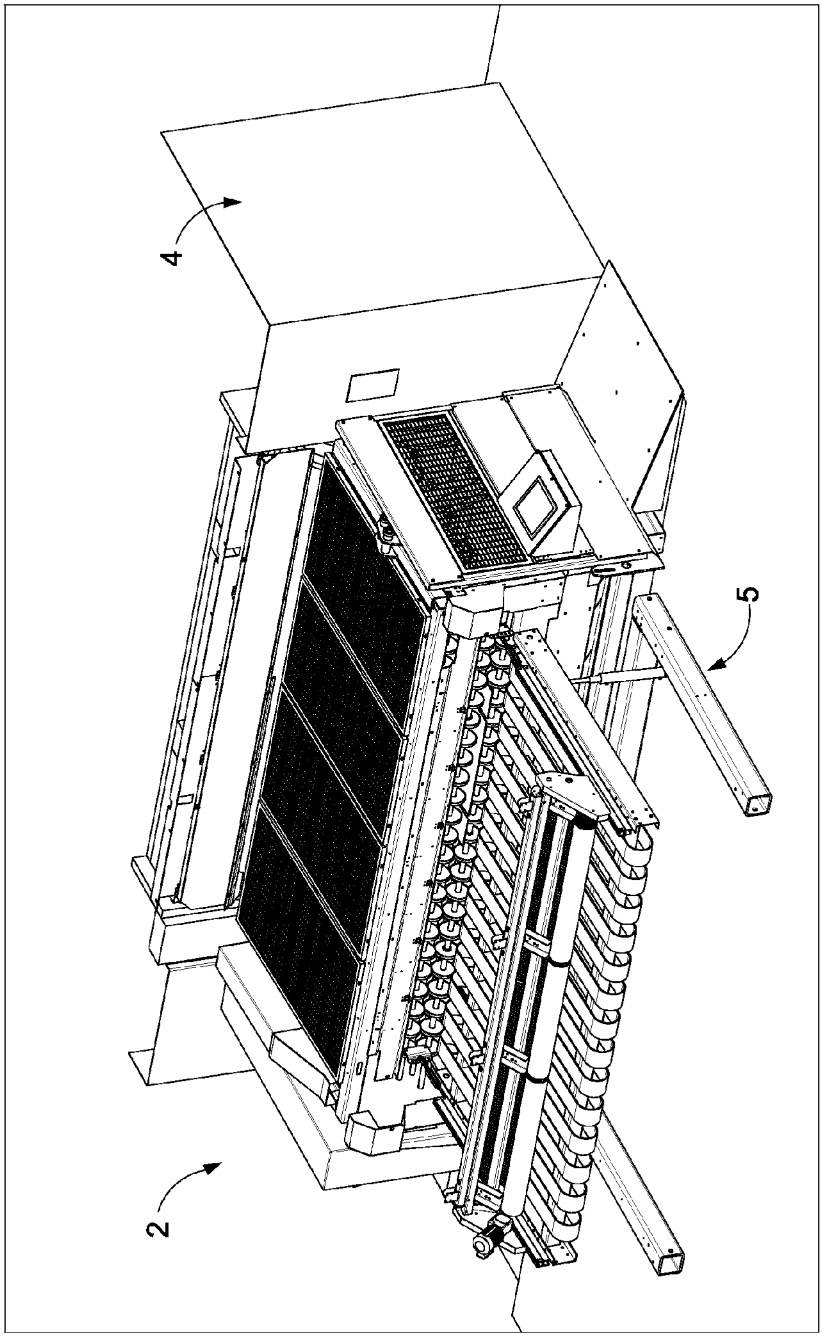
FIG. 1 depicts one embodiment of a Layboy interfacing with a Rotary Die Cutter and a down stream conveyor.
Figure 2:
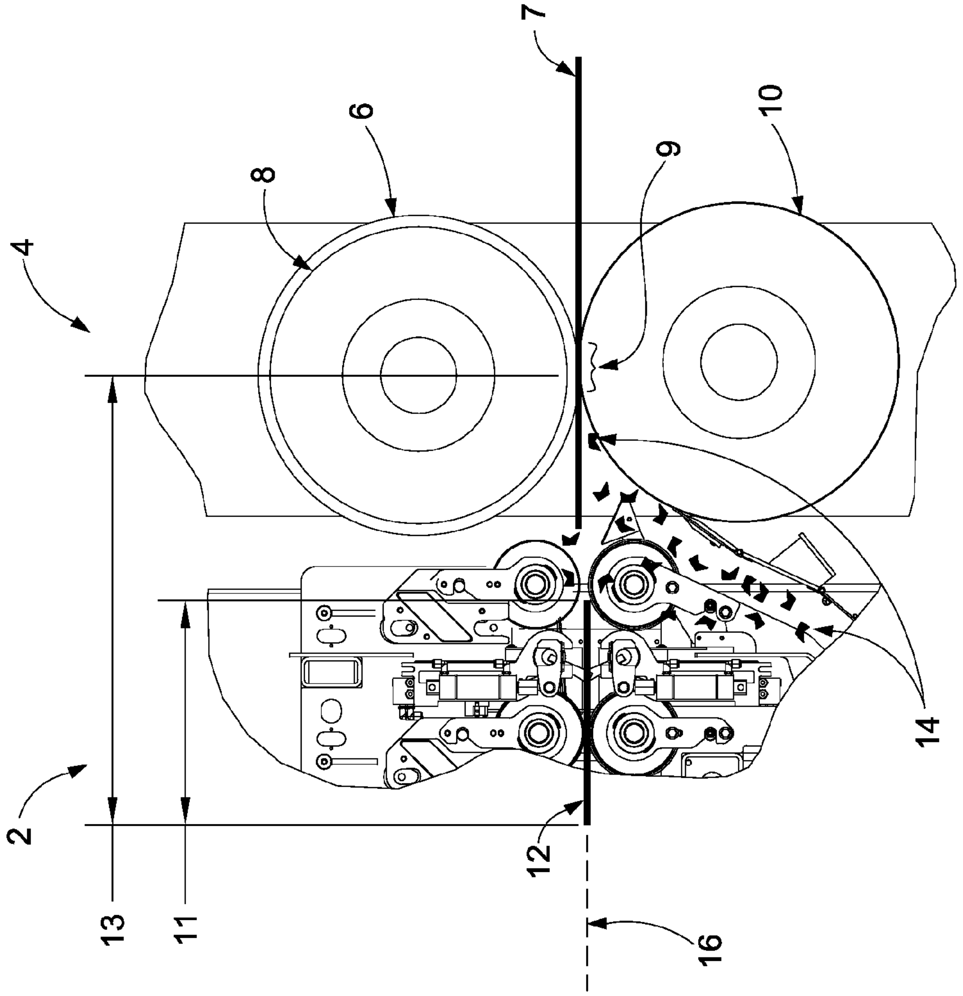
FIG. 2 is a simplified drawing of one embodiment of a Layboy interfacing with a Rotary Die Cutter.

The typical Rotary Die Cutter operation with the improved Layboy is shown in FIG. 1, which depicts a Layboy 2 adjacent to a Rotary Die Cutter 4 with a downstream conveyor 5. The Layboy 2 and Rotary Die Cuter 4 are also shown in FIG. 2 using a simplified representation. The Die Board 6 is located on the top cylinder 8 and the Anvil 10 is located on the bottom such that as the box 12 and Scrap 14 are being created from the Corrugate Stock Sheet 7, the box 12 theoretically continues on Board Line 16 and ideally the Scrap is ejected below Board Line 16. In practice, for a variety of reasons the Scrap may not all be ejected below Board Line 16. Some Rotary Die Cutters reverse the Die Board and Anvil so the Die Board is located on the bottom.

The challenge for the Layboy is the conflicting requirements between providing the proper transportation of the box while also providing proper means for separation of the Scrap from the Boxes. The transportation requirement alone would lead to substantially high percentage or even a 100% supporting surfaces in order to provide full support to the boxes which can have a wide variety of Scoring and Flaps. This could be done with a full width bottom vacuum conveyor only, a full width top vacuum conveyor only, a plurality of relatively wide and relatively closely laterally spaced top and bottom conveyors arranged in a sandwich arrangement or many other combinations of conveyors. The Scrap separation requirement alone would lead to the opposite solution, since the Scrap needs the maximum amount of area to be able to fall away from the Box during transportation.

The effect of this conflict is evident in the prior art. In U.S. Pat. No. 3,860,232 the Conveyors are thin to aid in Scrap removal but at the expense of support, and also require the lateral positioning of the conveyors by the operator for each order to achieve proper box support, which increases Order Setup Time. If the number of conveyors increases, the area for Scrap removal is reduced and the likelihood of Scrap being carried along with the box increases.

One problem with conveyors regarding Scrap removal is that the Conveyor Belt is moving along with the product, which can serve to transport the Scrap. This is one of the problems solved by the technology described herein. In one embodiment, a combination of one or more Wheel Assemblies in the Layboy transport system along with one or more of the various Scrap Separation Means results in an elegant solution to the multiple requirements of the Layboy.

For the purposes of this document, a wheel is a substantially round cylinder with a wheel center axis and a width narrow enough such that when laterally spaced across a production Layboy will provide an adequate number of supports to the box while leaving adequate gaps to allow Scrap to fall free from the Board Line. The width of the wheel must be wide enough to allow the ability to apply pressure to the box to achieve driving friction without causing False Scoring. In the preferred embodiment, the wheels are ¾ inches wide. However, other sizes can also be used.

Figure 3:
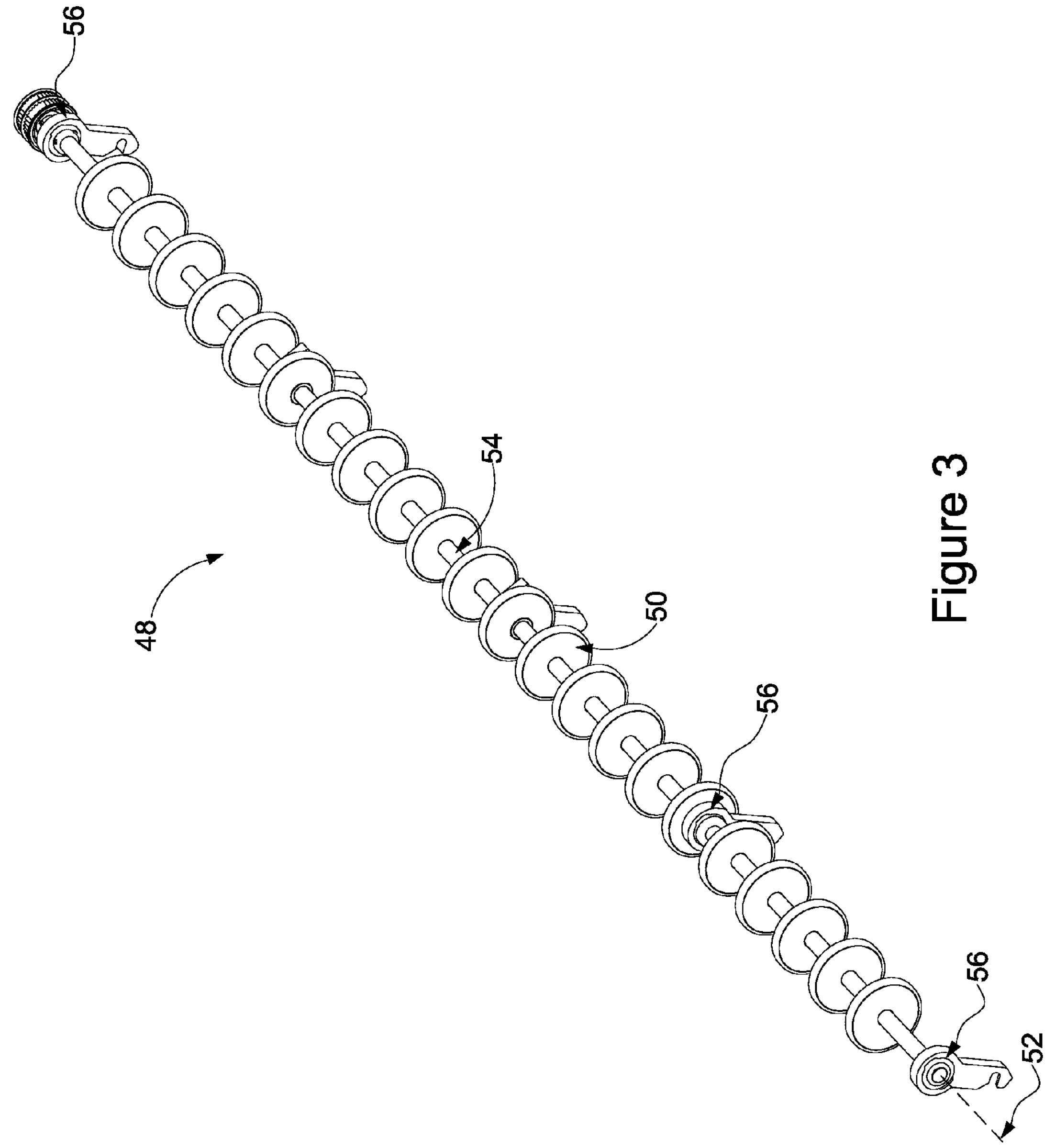
FIG. 3 depicts one embodiment of a wheel assembly.
Figure 4:
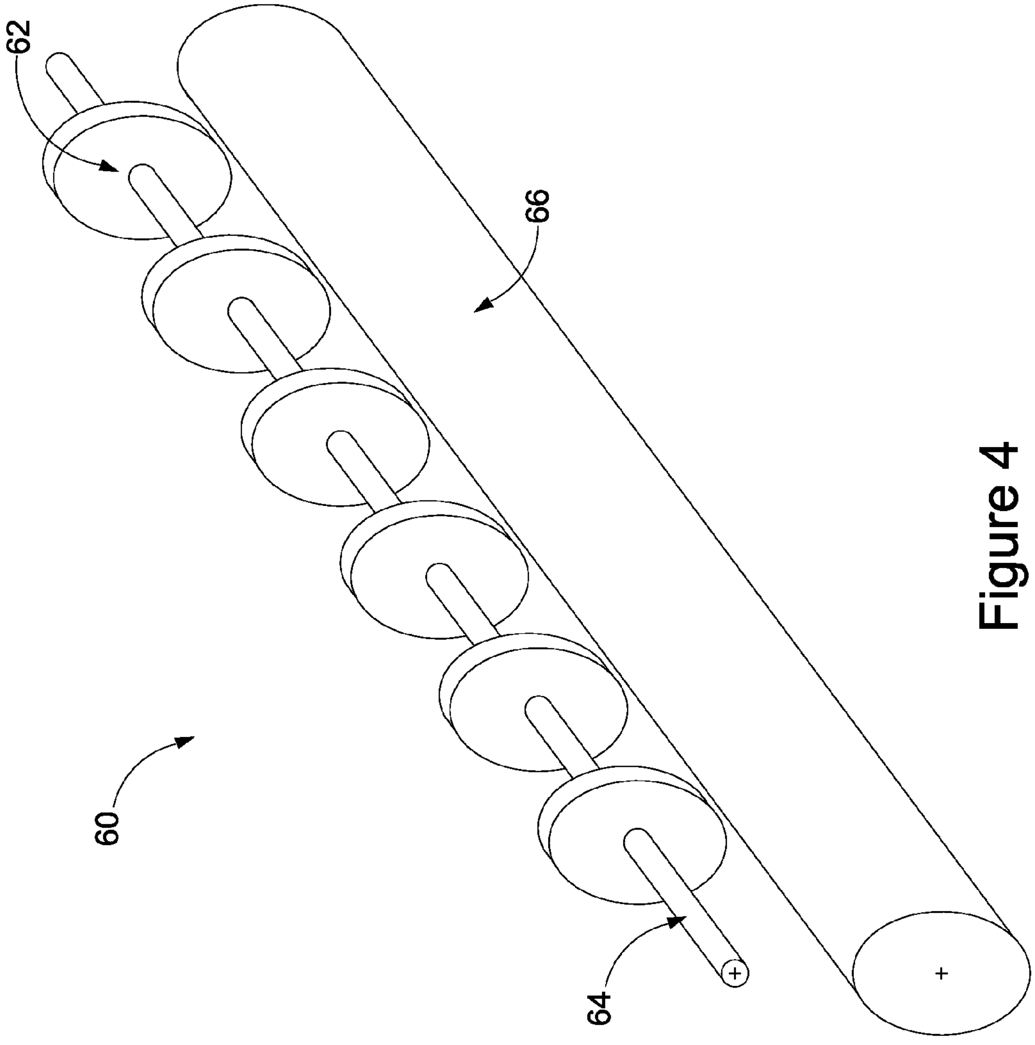
FIG. 4 depicts one embodiment of a wheel assembly.
Figure 5:
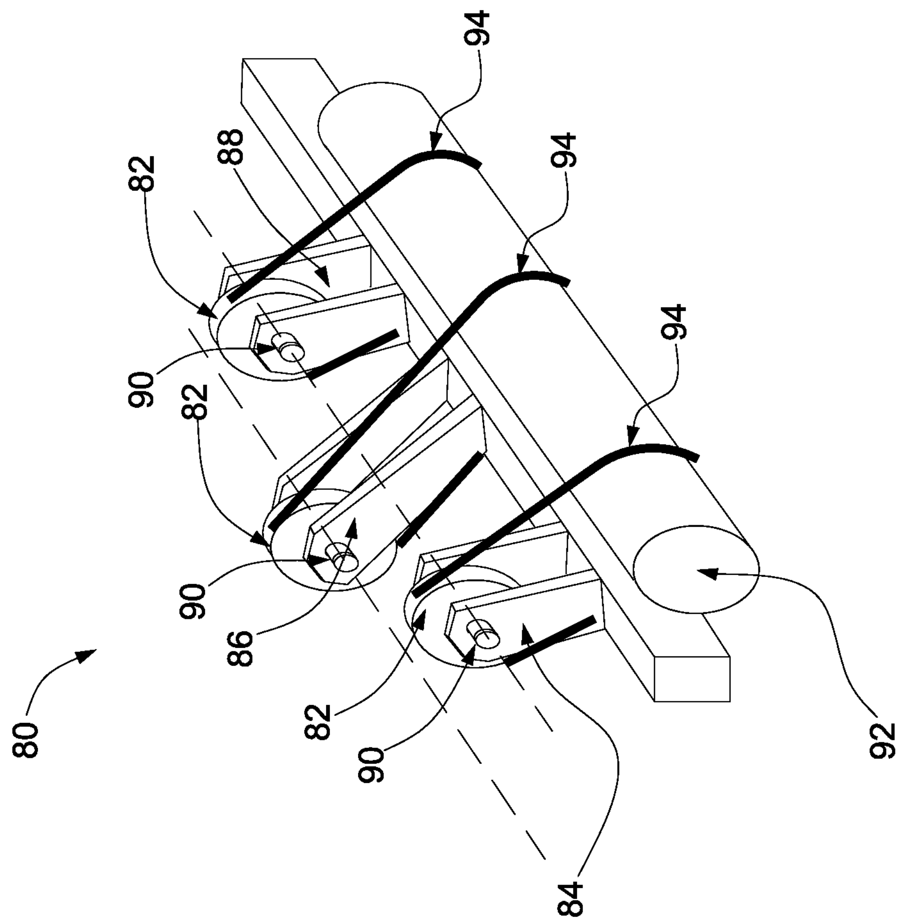
FIG. 5 depicts one embodiment of a wheel assembly.

A Wheel Assembly 48 shown in FIG. 3 consist of a series of wheels 50 configured to rotate about a wheel axis 52 with the Wheels laterally positioned in order to create gaps between the Wheels. In one embodiment, a common wheel shaft 54 concentric to the Wheel Axis 52 is directly coupled to the series of wheels laterally positioned on the Wheel Shaft allowing both support and the ability for all Wheels on the Wheel Assembly to be driven by applying torque to the common wheel shaft 54. Two or more wheel shaft bearings 56 are mounted to the wheel shaft 54 to allow connection to the machinery framework. However, other configurations are possible. For example, in FIG. 4 a Wheel Assembly 60 is constructed using a series of idler pulleys (wheels 62) mounted to a common shaft 64 for free rotation which are then driven on their surfaces by an additional surface drive roller 66. In FIG. 5, a wheel assembly 80 is constructed with wheels 82, again laterally positioned, but supported by extension brackets 84, 86, 88 such that it would be possible to have multiple nonaligned wheel axes 90. Alternate drive means are provided in this case using an alternate drive shaft 92 and conveying belts 94, for the purposes of torque to the wheels as opposed to transport as in the prior art.

As described in more detail below, one embodiment of the Layboy will include a plurality of top Wheel Assemblies and a plurality of bottom Wheel Assemblies, with Boxes (and, potentially, Scrap) being transported between the plurality of top Wheel Assemblies and a plurality of bottom Wheel Assemblies.

There are multiple Scrap Separation Means that can be used with the Layboy described herein.

Figure 6:
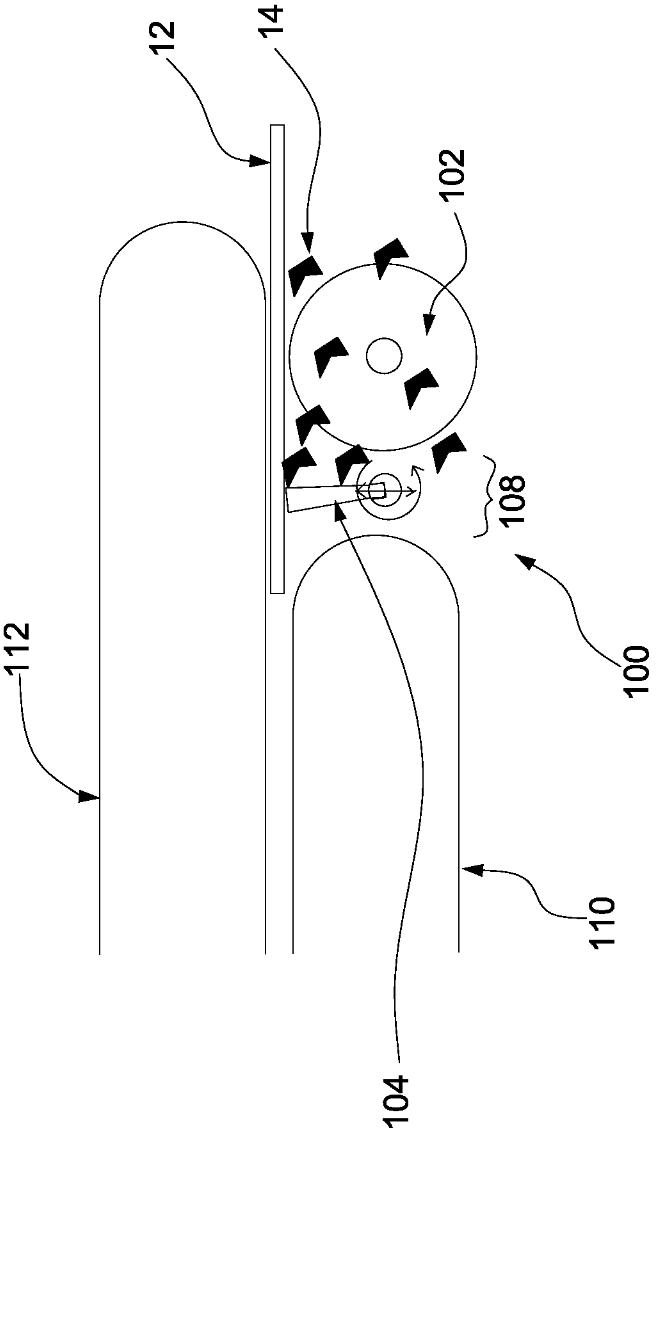
FIG. 6 depicts one embodiment of a Compliant Scrap Blocker.

One embodiment of a Scrap Separation Means is the Compliant Scrap Blocker 100, as shown in FIG. 6 in combination a single bottom Wheel Assembly 102. The Compliant Scrap Blockers are most effective in the separation of Loose Scrap. In one example embodiment, Compliant Scrap Blocker 100 is constructed using strip brushes 104 extending across the machine. While a fixed position would be functional, in the preferred embodiment both vertical adjustment and rotational adjustment are controllable. The compliant nature of strip brushes 104 or other materials such a flexible plastic or rubber allow the Compliant Scrap Blocker 100 to be able to make contact with box 12 as it is being transported, allowing box 12 to continue forward while causing complete stoppage or partial deceleration of Scrap 14. The improvement is the resulting Scrap Gap 108 on the entrance side of the Compliant Scrap Blocker 100 which extends across the width of the machine and also includes the area caused by the lateral spacing of the Wheels on the Wheel Assembly. In the prior art, the bottom Conveyor would have a Conveyor Belt spanning the Scrap Gap reducing the effectiveness of the Compliant Scrap Blocker. If the Wheel Assembly was replaced by a solid, full-machine-width roller the Scrap Gap would be substantially reduced unless further spaced from the Compliant Scrap Blocker, which would in turn have the downside of increasing the distance between longitudinal supports. The embodiment of FIG. 6 shows Compliant Scrap Blocker 100 adjacent a Bottom Conveyor 110 and Top Conveyor 112.

Figure 7:
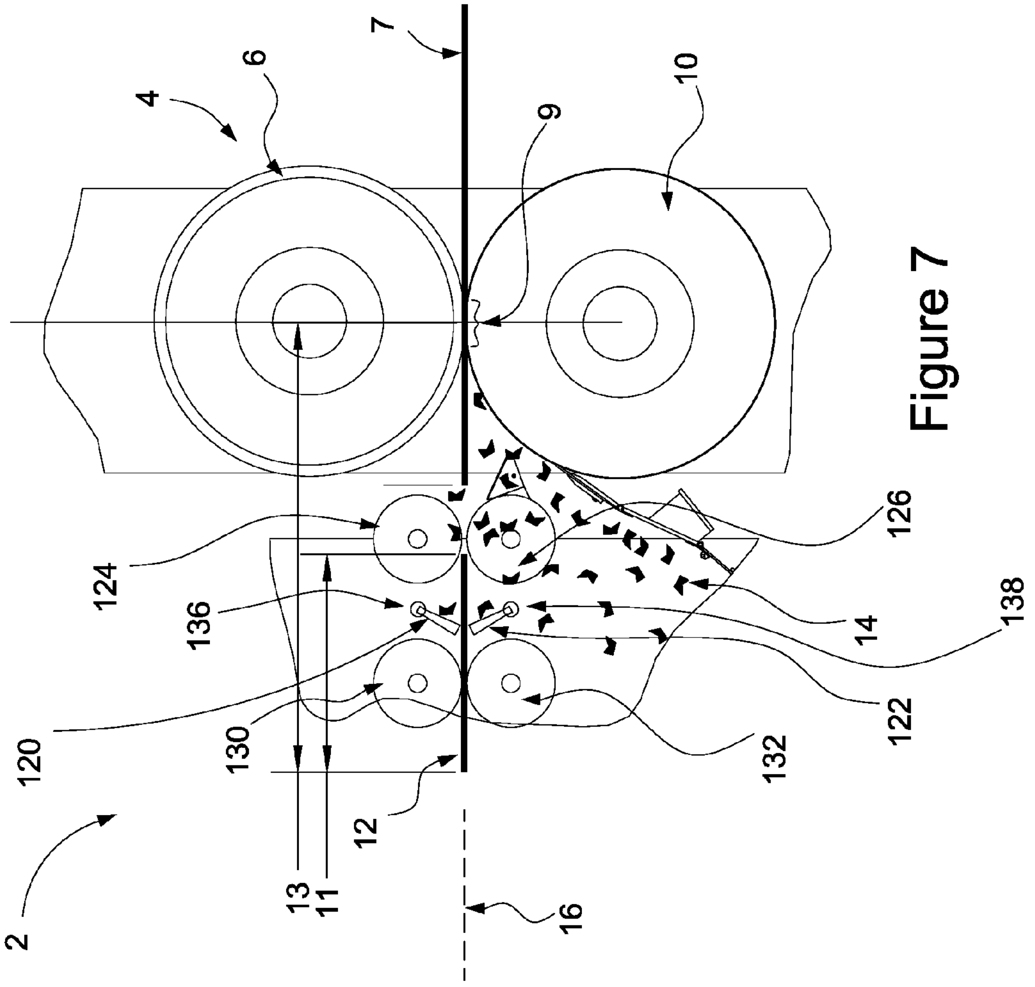
FIG. 7 depicts one embodiment of a Compliant Scrap Blocker.

Another embodiment of the Compliant Scrap Blocker is depicted in FIG. 7. In this embodiment, there are Compliant Scrap Blockers 120 and 122 located on the top and the bottom of the box. Compliant Scrap Blockers 120 and 122 are downstream of top Wheel Assembly 124, bottom Wheel Assembly 126, and Rotary Die Cutter 4. FIG. 7 also shows top Wheel Assembly 130 and bottom Wheel Assembly 132. There is a gap 136 between top Wheel Assemblies 124 and 130. Compliant Scrap blocker 120 is positioned in gap 136. There is a gap 138 between bottom Wheel Assemblies 126 and 132. Compliant Scrap blocker 122 is positioned in gap 138. The arrangement of FIG. 7 allows effective Scrap separation of both Scrap above and below Board Line 16.

Another embodiment of the Scrap Separation Means are the Opposing Phase Shift Beater Bars, as shown in FIGS. 8A and 8B in combination with top and bottom entry and exit Wheel Assemblies. The drawings show top Beater Bar 150 above bottom Beater Bar 152. Top Beater Bar 150 and bottom Beater Bar 152 are positioned in a gap between the entry and exit Wheel Assemblies. The exit Wheel Assemblies includes top Wheel Assembly 160 and bottom Wheel Assembly 162. The entrance Wheel Assemblies includes top Wheel Assembly 164 and bottom Wheel Assembly 166. The top Beater Bar 150 is between the two top Wheel Assemblies. The bottom Beater Bar 152 is between the two bottom Wheel Assemblies. The generic concept of a beater bar is known in the prior art, such as in U.S. Pat. No. 4,900,297. The basic physics of beating the box is based on being able to cause such a harsh acceleration of the box relative to the Trapped Scrap or Hanging Chads as to create separation of the Box from the Scrap.

The Opposing Phase Shift Beater Bars described herein provides superior separation for two reasons: Direct Beating Contact and Opposing Beating. One embodiment combines a top and bottom hexagon-shaped rotating beater bar pair 150 and 152. This combined with the Wheel Assemblies results in the boxes being exposed directly to the beater bar surfaces for Direct Beating Contact, as opposed to having a Conveyor Belt between the box and the beater bar, as in prior art devices. The interference of the Conveyor Belt has two substantial downsides. First, the Conveyor Belt can help carry Scrap through or keep Scrap trapped as the box travels through the beating section. Second, the Conveyor Belts will dampen the energy ultimately meant for the boxes and Scrap. The concept of Opposing Beating allows a dramatic increase in both the frequency and magnitude of the acceleration imparted to the box and Scrap. In the prior art, the single non-opposed beater bar can impart an acceleration from one side but then has to rely on gravity and Conveyor Belt tension to decelerate and bring the box back to the beater for its next beat, i.e. acceleration. However, the Opposing Beating uses phase-shifting controls to have the box and Scrap positively accelerate first up and then down by a similar means. Controlling the nip and the phase shift of the Opposing Phase Shift Beater Bar allows variation in the amount of energy imparted to the box. This allows maximum Scrap removal while still being able to avoid False Scoring.

It was discovered that a phenomenon referred to as Beater Tail Whip can be a challenge with the basic Opposing Phase Shift Beater Bar. While the box is supported by the entrance and exit Wheel Assemblies, the box is able to take the beating without damage. However, if the Lead Edge or Trail Edge is unsupported by a Wheel Assembly, the inertia of the unsupported box can cause False Scoring. One embodiment, the hex-shaped beater bars are segmented and interlaced with Beater Tail Supports 170 and 172 to limit the up and down travel of the tail of the box and thus avoid the False Scoring.

Another embodiment of the Scrap Separation Means is the Chad Wall, as shown in FIG. 9 in combination with top and bottom entry and exit Wheel Assemblies. FIG. 9 depicts Chad Wall 200 is positioned in a gap between entry and exit Wheel Assemblies. The entry Wheel Assemblies include top Wheel Assembly 202 and Bottom Wheel Assembly 204. The exit Wheel Assembly includes Top Wheel Assembly 206 and Bottom Wheel Assembly 208. Thus, the Chad Wall is between the two top Wheel Assemblies, and the Chad Wall is between the two bottom Wheel Assemblies.

Through extensive experimentation with Compliant Scrap Blockers it was determined that while effective on Loose Scrap, the Compliant Scrap Blockers have little effect on Trapped Scrap and less effect on Hanging Chads, especially those with substantial Hanging Chad Strength. Since the Compliant Scrap Blockers are allowed to touch the Boxes as they are transported, there are fundamental conflict in constraints with regard to Hanging Chads. In order to impart more force to separate the Hanging Chads with larger Hanging Chad Strength, the compliance of the Compliant Scrap Blockers would need to be reduced. However, as this would result in increased drag on the Box and limiting the ability of proper transportation of the box. The Chad Wall is a Scrap Separation Means without this negative constraint.

The Chad Wall 200 includes top and bottom Chad Wall Barriers that are roughly aligned vertical to each other creating a Chad Wall Gap 210 extended across the width of the machine for the box to be transported through. The Chad Wall Gap 210 is controllable based on box thickness, board warp and size of Hanging Chads. While the Chad Wall Barrier 200 would essentially be a rigid material of full width, the preferred embodiment uses a construction of a plurality of segmented carbon fiber material attached to a pivot point 212 and retrained to the frame. The result is each segment being substantially rigid relative to the Hanging Chad Strength but having the ability to bend locally should a Jam or bent Flap occur and need to pass through the Chad Wall 200.

This embodiment of the Scrap Separation Means includes a Chad Wall Funnel, which comprises a plurality of Chad Wall Funnel Bars 220 that are spaced laterally across the machine and angled. The Chad Wall Funnel Bars create a funnel to the Box as it is being transported. The size of the Chad Wall Funnel Bars and spacing is to allow the funneling to affect the path of the box but to allow the Hanging Chad to dangle outside the Board Line. In one embodiment, the Chad Wall Funnel Bars are round, with a diameter of ⅛ of an inch and a 2 inch spacing. Other equivalent shapes, sizes and spacings are possible as long as the effect of allowing the Hanging Chad to dangle outside the Board Line is preserved. As the Box is transported though the Chad Wall Gap, the Box has little or no contact with the Chad Wall Barrier but the dangling Hanging Chads will experience a substantial tearing force to achieve separation.

Another embodiment of the Scrap Separation Means is the Compliant Scrap Blocker-Wedge Roller, as depicted in FIGS. 10 and 11 in combination with top and bottom entry and exit Wheel Assemblies. The Compliant Scrap Blocker-Wedge Roller consists of a lower substantially continuous full width roller (Wedge Roller 250) under the Board Line 16 and a Compliant Scrap Blocker 252 above the Board Line 16. An equivalent Wedge Roller may have some gaps across the machine to allow additional center bearings for engineering purposes. Unlike the top and bottom opposing Compliant Scrap Blockers, this Scrap Separation Means has a driving surface of the Wedge Roller 250 to aid in the transporting of the Box 12 and allows for potentially less compliance in Compliant Scrap Blocker either through material change or simply increased nip or angle adjustments.

The Compliant Scrap Blocker 252 and Wedge Roller 250 are positioned in a gap between entry and exit Wheel Assemblies. The entry Wheel Assemblies include top Wheel Assembly 260 and Bottom Wheel Assembly 262. The exit Wheel Assembly includes Top Wheel Assembly 266 and Bottom Wheel Assembly 268. Thus, the Compliant Scrap Blocker 252 is between the two top Wheel Assemblies, and the Wedge Roller 250 is between the two bottom Wheel Assemblies.

One of the challenges of Scrap Removal is the basic fact the Lead Edge Trim Scrap, Trail Edge Trim Scrap and Internal Scrap above the Board Line can only get below the Board Line by falling through the gaps across the machine created between boxes due to the Ups and between the gap caused by the feeding of each Corrugated Sheet Stock. Edge Trim Scrap can fall around the outside edges. In high speed production, the time that these gaps are present to a piece of Scrap can be very short and not always effective when relying on only gravity and randomness.

A positive means for getting Scrap from above the Board Line to below the Board Line can be achieved by offsetting the Compliant Scrap Blocker-Wedge Roller so that the transporting surface of the Wedge Roller 250 is below the transporting surface of the lower Wheel Assembly 262 upstream of the Compliant Scrap Blocker-Wedge Roller. As shown in FIG. 11, as the box 12 passes through the Compliant Scrap Blocker-Wedge Roller, Scrap 14 above the Board Line 16 will naturally get wedged near the Wedge-Roller surface, which the below the Board Line 16. As the next box is transported through, the Lead Edge of the box is above the Scrap 14 and will help drive the Scrap 14 the rest of the way through the Compliant Scrap Blocker-Wedge Roller, but the Scrap is now below the Board Line 16.

Another embodiment of the Scrap Separation Means is the Side Edge Trim Chad Stripper, as shown in FIG. 12. In one embodiment, the Side Edge Trim Chad Stripper is positioned in a gap between top and bottom entry and exit Wheel Assemblies. Side Edge Trim Chads are common and can have substantial Hanging Chad Strength. This Separation Means focuses on this type of Scrap. A lower roller 300 extends across the width of the machine. Since the rolling surface is only required near the edge of the boxes, it would be equivalent to have two rollers on each side of the machine. A width adjustable barrier 302 is mounting such that it can be positioned with a small clearance relative to the roller in the vertical direction and is adjusted across the machine so that a box 12 without Side Edge Trim would pass untouched but close enough so that Side Edge Trim would impact the barrier. The barrier could be substantially rigid, but in the preferred embodiment would be compliant to allow imparting adequate tearing force to the Side Edge Trim Chads but would allow jams or skewed boxes to pass without creating a jam.

There are multiple effective combinations of the Wheel Assemblies and the various Scrap Separation Means. One effective combination it shown in FIGS. 13A and 13B, with FIG. 13B being a simplified version of FIG. 13A. As the box is transported from the entrance to exit end of the Layboy, the Scrap Removal Means consist of a Compliant Scrap Blocker 300, Opposing Phase Shift Beater Bars 302, Compliant Scrap Blocker-Wedge Roller 304 and finally another Compliant Scrap Blocker 306. Should the Box Maker have more problems certain types of Scrap other combinations may be more effective, for instance Compliant Scrap Blocker, Opposing Phase Shift Beater Bar, Chad Wall, Edge Trim Chad Stripper and finally another Compliant Scrap Blocker would be well suited for the Box Maker struggling with excessive Edge Trim Scrap.

As the box is being die cut by the Die Board, the position and velocity of the box in theory should be completely controlled by the Die Board and Anvil contact region. Since there are a variety of box lengths 11, the control of the box by the Die Board is the distance of the Lead Edge of the Box to the Die Board Control Zone, which is approximately the box length. Once the Trail Edge of the box has exited the Die Board Control Zone it is the responsibility of the Layboy to transport the box. It is common for the transportation speed of the box within the Layboy, i.e. Layboy Speed, to be greater than the Line Speed in order to pull a gap between Ups in preparation for the shingling of the box on downstream processing equipment. Ideally, the box would be completely controlled by the Press until the box is released from the Press's nip and then the Layboy could take control. Pulling too soon can lead to Print Damage or effect the Box Size. Letting the box fly uncontrolled or not making a full width transition very close to simultaneously can lead to skewed boxes in the Layboy.

In the prior art, the usage of sandwich type Conveyor Belts have attempt this transition using a sandwich wedge such that the gap of the wedge near the press is varied independent of the downstream gap. The problem is that the slope of the gap change is very shallow and there is no clear transition point.

In the present invention, as shown in FIG. 14, the Wheel Assemblies are arranged in a special way adjacent to the Die Board Control Zone. The Wheel Assemblies are arranged in vertical pairs (400/402, 404/406, 408/410 and 412/414), with the wheels of the top Wheel Assembly of a vertical pair laterally staggered to those of the bottom Wheel Assembly of the same vertical pair. While the Master Nip Control affects the gap between these Wheel Assembly pairs, the top Wheel Assembly of a vertical pair can be independently lifted to increase the gap 416 such that the box is funneled/transported, but no substantial driving force is imparted onto the box. The Layboy's control system will selectively control which of the Wheel Assembly pairs are retracted (e.g., the top Wheel Assembly of a vertical pair can be independently lifted) based on the length of the box. The result is a stark transitions from essential no drive force to full drive force. An equivalent configuration would be to have the top Wheel Assembly fixed and lower the bottom Wheel Assembly, or to make both top and bottom adjustable.

The use of the Wheel Assemblies can provide substantial Scrap falling area, level box support at the Board Line and consistent transportation drive without False Scoring. FIG. 15 shows the preferred embodiment of the Wheel Assemblies looking at the above Board Line Wheel Assemblies (e.g., top Wheel Assemblies) from a low angle. FIG. 16 shows above and below Board Line Wheel Assemblies (e.g., top and bottom Wheel Assemblies). FIGS. 17A-C show a typical view when looking downstream into the flow of the material. The top Wheel Assembly 450 and bottom Wheel Assembly 452 are laterally staggered in three different embodiments corresponding to FIGS. 17A, B and C. This has the desirable result of no points with wheel to wheel direct alignment, referred to as a hard nip. When staggered, the box is flexed by the non-align opposing force and essentially provides compliance before False Scoring and additional tolerance for machinery dimensional errors. As shown in FIG. 17, the top and bottom Wheel Assemblies are connected to independent frames and can be shifted laterally to each other. This allows the avoidance of edge trim hitting the first wheel; possible running of orders that find certain nips problematic; and can change the flexing, and pressure relationship between the Master Nip Adjust and the box.

Another substantial advantage of the Wheel Assemblies is that they can be interleaved or not depending on the desired results. In one embodiment, the Wheel Assemblies near the entrance of the machine are not interleaved resulting in more substantial space for Scrap to fall through. Near the exit end of the Layboy, the wheels are interleaved to give more positive drive for Scrap Removal and the bulk of the Scrap has already been removed.

Another substantial advantage of the Wheel Assemblies is that they can be driven by timing belts as shown in FIG. 18. Since there is no slip from the wheel to the shaft or from the shaft to the timing belt system, all surface speeds are precisely consistent.

There is a wide variety of equivalent wheel construction and surfaces. The goals are to provide adequate drive friction, proper contact pressure area and minimal maintenance. A configuration of Wheels is shown in FIG. 19, which shows aluminum wheels 500 with a steel surface 506 on the top Wheel Assemblies and aluminum wheels 502 with a flat urethane surface 504 on the bottom Wheel assemblies.

A Master Nip Control System is implemented using position controlled wedge blocks and wheels to vertically adjust the top set of Wheel Assemblies relative to the lower set of Wheel Assemblies, as depicted in FIG. 20. For wheels with possible wear issues over time, a split quick repair design is desirable.

As the boxes are transported through the Layboy, it is desirable to first avoid creating a jam and second being able to detect a jam. By using a plurality of eyes to track the lead edge and trail edge of the boxes, the computer can in real time make decisions about how well the boxes are being transported through the Layboy. For avoidance of jam, should the beginning of skewing be detected or substantial gap loss or velocity change, the adjustments to the various Scrap Removal Means can be made by either informing the operator or making the changes automatically. If box control is so bad that the computer considers a jam immanent, the feed to the press can be automatically interrupted. In addition, the operator can be notified in which section of the machine the jam originated.

The Board Flow Sensing concept can be taken one step further to solve a problem haunting the Box Maker. Due to a variety of reasons, when producing 2 or more Up boxes, dimensional variation can occur between the first and second up. If it is too great, the boxes are unsellable. Using one of more eyes along with high speed electronics, the length of the sheet can be measured and either the computer can inform the operator or automatically stop production. A more sophisticated method to yield better results involve using eye pairs phase shifted downstream to get both position and velocity information about the lead and trail edges of the box.

FIGS. 21, 22, and 23 shows the clam shell design of the Layboy. The Master Nip Adjust allow straight vertical lift clearing of most jams, but the additional ability of pivoting the top section helps in clearing of jams and allow easier maintenance. FIG. 21 shows Layboy 2 with a plurality of top Wheel Assemblies 600 and a plurality of bottom Wheel Assemblies 602 in a running position. FIG. 22 shows Layboy 2 with a plurality of top Wheel Assemblies 600 and a plurality of bottom Wheel Assemblies 602 in an open position to clear jams. FIG. 23 shows Layboy 2 with a plurality of top Wheel Assemblies 600 and a plurality of bottom Wheel Assemblies 602 in an open position to perform maintenance. The open position to perform maintenance is a wider open position than the open position to clear jams.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated.

What is claimed is:

1. An apparatus for transporting corrugated boxes, comprising:

a plurality of top wheel assemblies; and a plurality of bottom wheel assemblies that are below the top wheel assemblies, the top wheel assemblies and bottom wheel assemblies receive a box with scrap created by rotary die cutting and transport the box between the top wheel assemblies and bottom wheel assemblies, wheels of the bottom wheel assemblies are staggered from wheels of the top wheel assemblies causing the box to flex when being transported between the top wheel assemblies and bottom wheel assemblies, the wheels of the top wheel assemblies are driven, the wheels of the bottom wheel assemblies are driven, relative positioning of the wheels of the top wheel assemblies and bottom wheel assemblies can be adjusted, the top wheel assemblies and the bottom wheel assemblies are arranged in vertical pairs, each vertical pair including one top wheel assembly and one bottom wheel assembly having its wheels staggered with respect to the top wheel assembly of the vertical pair, vertical spacing between wheel assemblies within a vertical pair can be independently controlled for one or more of the vertical pairs based on length of the corrugated stock sheet.

2. An apparatus for transporting corrugated boxes, comprising:

a plurality of top wheel assemblies; and a plurality of bottom wheel assemblies that are below the top wheel assemblies, the top wheel assemblies and bottom wheel assemblies receive a box with scrap created by rotary die cutting and transport the box between the top wheel assemblies and bottom wheel assemblies, wheels of the bottom wheel assemblies are staggered from wheels of the top wheel assemblies causing the box to flex when being transported between the top wheel assemblies and bottom wheel assemblies, the wheels of the top wheel assemblies are driven, the wheels of the bottom wheel assemblies are driven, relative positioning of the wheels of the top wheel assemblies and bottom wheel assemblies can be adjusted, the top wheel assemblies and the bottom wheel assemblies are arranged in vertical pairs, each vertical pair including one top wheel assembly of wheels and one bottom wheel assembly having its wheels staggered with respect to the top wheel assembly, a particular vertical pair is in proximity to a Die Cutter, the wheels of the particular vertical pair are driven to move the corrugated stock sheet through the particular vertical pair at a speed that is greater than line speed of the Die Cutter.

3. The apparatus of claim 2, wherein:

positioning of the wheels of the top wheel assemblies can be adjusted laterally, independent of the wheels of the bottom assembly.

4. The apparatus of claim 2, wherein:

positioning of the wheels of the bottom assemblies can be adjusted laterally, independent of the wheels of the top assembly.

5. The apparatus of claim 2, wherein:

positioning of one or more of the top wheel assemblies can be adjusted in a vertical direction.

6. The apparatus of claim 2, wherein:

positioning of one or more of the bottom wheel assemblies can be adjusted in a vertical direction.

7. The apparatus of claim 2, wherein:
adjusting the relative positioning of the wheels of the top wheel assemblies and bottom wheel assemblies changes the flexing of the box.

8. The apparatus of claim 2, wherein:
adjusting the relative positioning of the wheels of the top wheel assemblies and bottom assemblies changes pressure on the box.

9. The apparatus of claim 2, wherein:
adjusting the relative positioning of the wheels of the top wheel assemblies and bottom assemblies changes drive force on the box.

10. The apparatus of claim 2, further comprising:
one or more scrap removers adjacent to the top wheel assemblies and the bottom wheel assemblies.

11. The apparatus of claim 10, wherein:
the plurality of bottom wheel assemblies include one or more gaps between wheel assemblies, the one or more scrap removers are positioned in the one or more gaps.

12. The apparatus of claim 11, wherein:
the one or more gaps include multiple gaps separated from each other in the through-machine direction;
the one or more gaps are also positioned between wheel assemblies of the plurality of top wheel assemblies; and
the one or more scrap removers include multiple scrap removers, each of the scrap removers is positioned in a different gap of the multiple gaps such that box would interact with the multiple scrap removers sequentially while being transported between the top wheel assemblies and the bottom wheel assemblies.

13. The apparatus of claim 12, wherein:
the one or more gaps extend across a width of the apparatus;
the one or more scrap removers extend across the width of the apparatus;
the one or more scrap removers function to motivate scrap to be separated from corrugated stock sheet;
the one or more gaps provide uninterrupted spacing for scrap to fall;
space between wheels of the lower wheel assembly provides spacing for scrap to fall; and
positioning of the wheels of the wheels of the bottom assemblies as being staggered from wheels of the top assemblies is arranged such that the wheels are not in direct vertical alignment and do not form a hard nip.

14. The apparatus of claim 10, wherein:
the one or more scrap removers include top and bottom brushes positioned across the top wheel assemblies and the bottom wheel assemblies.

15. The apparatus of claim 14, wherein:
the brushes can be adjusted vertically.

16. The apparatus of claim 14, wherein:
the brushes can be adjusted rotationally.

17. The apparatus of claim 10, wherein:
the one or more scrap removers include a brush that extends in a direction across the top wheel assemblies and a roller that is below the brush and extends in a direction across the bottom wheel assemblies.

18. The apparatus of claim 17, wherein:
a transporting surface of the roller is below a transporting surface of the bottom wheel assemblies.

19. The apparatus of claim 17, wherein:
the brush can be adjusted vertically.

20. The apparatus of claim 17, wherein:
the brush can be adjusted rotationally.

21. The apparatus of claim 10, wherein:
the one or more scrap removers include opposing beater bars;
the opposing beater bars comprise a top beater bar and a bottom beater bar; and
the box can be transported between the top beater bar and the bottom beater bar with the box coming into direct contact with the top beater bar and the bottom beater bar.

22. The apparatus of claim 21, wherein:
the top beater bar and the bottom beater bar include hexagon shaped beaters;
the top beater bar rotates; and
the bottom beater bar rotates phase shifted from the top beater bar.

23. The apparatus of claim 21, wherein:
the opposing beater bars are segmented and interlaced with supports to limit the up and down travel of a tail of the corrugated stock sheet.

24. An apparatus for transporting corrugated boxes, comprising:
a plurality of top wheel assemblies;
a plurality of bottom wheel assemblies that are below the top wheel assemblies, the top wheel assemblies and bottom wheel assemblies receive a box with scrap created by rotary die cutting and transport the box between the top wheel assemblies and bottom wheel assemblies, wheels of the bottom wheel assemblies are staggered from wheels of the top wheel assemblies causing the box to flex when being transported between the top wheel assemblies and bottom wheel assemblies, the wheels of the top wheel assemblies are driven, the wheels of the bottom wheel assemblies are driven, relative positioning of the wheels of the top wheel assemblies and bottom wheel assemblies can be adjusted; and
one or more scrap removers adjacent to the top wheel assemblies and the bottom wheel assemblies, the one or more scrap removers include top and bottom chad wall barriers that are at least roughly vertically aligned, a space is formed between the top and bottom chad wall barriers that extends across the apparatus for corrugated stock sheet to be transported through.

25. The apparatus of claim 24, further comprising:
a chad wall funnel having a plurality of chad wall funnel bars that are spaced laterally across the apparatus and angled to create a funnel for the box to be transported through prior to being transported through the space formed between the top and bottom chad wall barriers.

26. An apparatus for transporting corrugated boxes, comprising:
a plurality of top wheel assemblies;
a plurality of bottom wheel assemblies that are below the top wheel assemblies, the top wheel assemblies and bottom wheel assemblies receive a box with scrap created by rotary die cutting and transport the box between the top wheel assemblies and bottom wheel assemblies, wheels of the bottom wheel assemblies are staggered from wheels of the top wheel assemblies causing the box to flex when being transported between the top wheel assemblies and bottom wheel assemblies, the wheels of the top wheel assemblies are driven, the wheels of the bottom wheel assemblies are driven, relative positioning of the wheels of the top wheel assemblies and bottom wheel assemblies can be adjusted; and
one or more scrap removers adjacent to the top wheel assemblies and the bottom wheel assemblies, the one or more scrap removers include one or more rollers that extend in a direction across the bottom wheel assemblies and a width adjustable barrier mounted with a small clearance relative to the roller in the vertical direction so that a box without edge trim would pass untouched by the barrier but a box with edge trim would have the edge trim impact the barrier.

27. An apparatus for transporting corrugated boxes, comprising:

a top wheel assembly;

a bottom wheel assembly that is below the top wheel assembly such that a box can be transported between the top wheel assembly and the bottom wheel assembly, the wheels of the bottom wheel assembly are staggered from the wheels of the top wheel assembly causing the box to flex when being transported between the top wheel assembly and bottom wheel assembly;

one or more scrap removers adjacent to the top wheel assembly and bottom wheel assembly; and additional top wheel assemblies and additional bottom wheel assemblies, the bottom wheel assemblies include one or more gaps between wheel assemblies, the one or more scrap removers are positioned in the one or more gaps, the one or more gaps include multiple gaps separated from each other in the through-machine direction, and the one or more scrap removers include multiple scrap removers, each of the scrap removers is positioned in a different gap of the multiple gaps such that box would interact with the multiple scrap removers sequentially while being transported between the top wheel assemblies and the bottom wheel assemblies.

28. A method for transporting corrugated boxes, comprising:

receiving a box with scrap between a plurality of top wheel assemblies and a plurality of bottom wheel assemblies that are below the top wheel assemblies, the wheels of the top wheel assemblies are driven, the wheels of the bottom wheel assemblies are driven, relative positioning of the wheels of the top wheel assemblies and bottom wheel assemblies can be adjusted;

transporting the box between the top wheel assemblies and the bottom wheel assemblies from an upstream location to a downstream location, wheels of the bottom wheel assemblies are staggered from wheels of the top wheel assemblies causing the box to flex when being transported between the top wheel assemblies and bottom wheel assemblies, the top wheel assemblies and the bottom wheel assemblies are arranged in vertical pairs, each vertical pair including one top wheel assembly and one bottom wheel assembly having its wheels staggered with respect to the top wheel assembly of the vertical pair; and independently controlling vertical spacing between wheel assemblies within a vertical pair for one or more of the vertical pairs based on length of the corrugated stock sheet.

29. The method of claim 28, further comprising:

removing scrap from the box using one or more scrap removers positioned adjacent to the top wheel assemblies and the bottom wheel assemblies.

30. The method of claim 29, wherein:

the bottom wheel assemblies include one or more gaps between wheel assemblies, the one or more scrap removers are positioned in the one or more gaps.

31. The method of claim 30, wherein:

the one or more gaps include multiple gaps separated from each other in the through-machine direction; and the one or more scrap removers include multiple scrap removers, each of the scrap removers is positioned in a different gape of the multiple gaps such that box would interact with the multiple scrap removers sequentially while being transported between the top wheel assemblies and the bottom wheel assemblies.

32. An apparatus for transporting corrugated boxes, comprising:

a plurality of top wheel assemblies; and a plurality of bottom wheel assemblies that are below the top wheel assemblies such that a box can be transported between the top wheel assemblies and bottom wheel assemblies, the top wheel assemblies and the bottom wheel assemblies are arranged in vertical pairs, each vertical pair including one top wheel assembly and one bottom wheel assembly, vertical spacing between wheel assemblies within a vertical pair can be independently controlled, a particular vertical pair for which vertical spacing between wheel assemblies can be independently controlled is in proximity to a Rotary Die Cutter, the wheels of the particular vertical pair are driven to move the box through the particular vertical pair at a speed that is greater than line speed of the Rotary Die Cutter.

33. The apparatus of claim 32, further comprising:

multiple scrap removers adjacent to the top wheel assemblies and the bottom wheel assemblies, the bottom wheel assemblies and top wheel assemblies include multiple gaps between wheel assemblies in a through-machine direction, each of the scrap removers is positioned in a different gape of the multiple gaps such that the box would interact with the multiple scrap removers sequentially while being transported between the top wheel assemblies and the bottom wheel assemblies.

34. An apparatus for transporting corrugated boxes, comprising:

a transport assembly that transports boxes with scrap from a rotary die cutter, the transport assembly comprises a top assembly and a bottom assembly that is below the top wheel assembly, the bottom assembly includes a bottom entry assembly and a bottom exit assembly with a gap between the bottom entry assembly and the bottom exit assembly;

brushes in proximity to the transport assembly that extend across the transport assembly; and a roller that is below the brushes and extends in a direction across the transport assembly, a transporting surface of the roller is below a transporting surface of the transport assembly, the roller is positioned in the gap between the bottom entry assembly and the bottom exit assembly.

35. An apparatus for transporting corrugated boxes, comprising:

a transport assembly that transports boxes with scrap from a rotary die cutter;

brushes in proximity to the transport assembly that extend across the transport assembly; and a roller that is below the brushes and extends in a direction across the transport assembly, a transporting surface of the roller is below a transporting surface of the transport assembly;

the transport assembly comprises a top wheel assembly and a bottom wheel assembly that is below the top wheel assembly such that boxes can be transported between the top wheel assembly and bottom wheel assembly while interacting with the brushes and roller, wheels of the bottom assembly are staggered from wheels of the top wheel assembly causing boxes to flex when being transported between the top wheel assembly and bottom wheel assembly.

36. An apparatus for transporting corrugated boxes, comprising:

a transport assembly that transports boxes with scrap from a rotary die cutter;

a support for boxes, in proximity to the transport assembly, that extends in the direction across the transport assembly; and a width adjustable barrier mounted with a small clearance relative to the support in the vertical direction so that boxes without edge trim can pass untouched by the barrier but boxes with edge trim would have the edge trim impact the barrier, the transport assembly comprises a top assembly of wheels and a bottom assembly of wheels that are below the top assembly of wheels such that boxes can be transported between the top assembly of wheels and bottom assembly of wheels while passing by the barrier, positioning of the wheels of the top assembly as staggered from the wheels of the bottom assembly causing the boxes to flex when being transported between the top assembly of wheels and bottom assembly of wheels.

37. An apparatus for transporting corrugated boxes, comprising:

a plurality of top wheel assemblies; and a plurality of bottom wheel assemblies that are below the top wheel assemblies, the top wheel assemblies and bottom wheel assemblies receive a box with scrap created by rotary die cutting and transport the box between the top wheel assemblies and bottom wheel assemblies, wheels of the bottom wheel assemblies are staggered from wheels of the top wheel assemblies causing the box to flex when being transported between the top wheel assemblies and bottom wheel assemblies, the wheels of the top wheel assemblies are driven, the wheels of the bottom wheel assemblies are driven, relative positioning of the wheels of the top wheel assemblies and bottom wheel assemblies can be adjusted, the top wheel assemblies and the bottom wheel assemblies are arranged in vertical pairs, each vertical pair including one top wheel assembly of wheels and one bottom wheel assembly having its wheels staggered with respect to the top wheel assembly, a particular vertical pair is in proximity to a Die Cutter.

* * * * *